US012703085B2

(12) United States Patent
Wakana

(10) Patent No.: US 12,703,085 B2
(45) Date of Patent: Aug. 11, 2026

(54) ARM DEVICE AND CABLE DECELERATION DEVICE

(71) Applicant: SONY GROUP CORPORATION, Tokyo (JP)

(72) Inventor: Kazuhito Wakana, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/839,373

(22) PCT Filed: Jan. 12, 2023

(86) PCT No.: PCT/JP2023/000693
§ 371 (c)(1),
(2) Date: Aug. 16, 2024

(87) PCT Pub. No.: WO2023/171121
PCT Pub. Date: Sep. 14, 2023

(65) Prior Publication Data

US 2025/0162138 A1 May 22, 2025

(30) Foreign Application Priority Data

Mar. 9, 2022 (JP) ................................ 2022-036461

(51) Int. Cl.
*B25J 9/10* (2006.01)

(52) U.S. Cl.
CPC .................................. *B25J 9/1045* (2013.01)

(58) Field of Classification Search
CPC ......... B25J 9/104; B25J 9/1045; A61B 34/71; A61B 2034/715
See application file for complete search history.

(56) References Cited

U.S. PATENT DOCUMENTS 5,807,377 A * 9/1998 Madhani ................ A61B 34/77 606/1
2009/0320638 A1* 12/2009 Lee ........................ B25J 9/1045 74/490.04

(Continued)

FOREIGN PATENT DOCUMENTS

JP 2002-503976 A 2/2002
JP 2007-510232 A 4/2007

(Continued)

OTHER PUBLICATIONS

Written Opinion of the International Searching Authority (English Translation) in PCT/JP2023/000693; Form PCT/ISA/237 (Year: 2024).*

(Continued)

*Primary Examiner* — Minnah L Seoh
*Assistant Examiner* — Gregory T Prather
(74) *Attorney, Agent, or Firm* — CHIP LAW GROUP

(57) ABSTRACT

Provided is an arm device in which a cable deceleration structure with improved degree of freedom of arrangement of a motor is applied to an active joint. The arm device includes one or more active shafts and includes an input capstan attached to an output shaft of a motor for driving at least one active shaft of the one or more active shafts, an output capstan attached to the at least one active shaft, an idler pulley disposed between the input capstan and the output capstan, and a cable wound around an outer periphery of each of the input capstan and the output capstan via the idler pulley.

24 Claims, 23 Drawing Sheets

(56) References Cited

U.S. PATENT DOCUMENTS

2014/0021240 A1* 1/2014 Miyamoto ....... A61B 17/07207
227/176.1
2022/0226056 A1* 7/2022 Beckman ............... A61B 34/71

FOREIGN PATENT DOCUMENTS

JP 2010-014270 A 1/2010
JP 2011-044185 A 3/2011
JP 2011-115918 A 6/2011
JP 2021-041038 A 3/2021
WO 2013/073523 A1 5/2013

OTHER PUBLICATIONS

International Search Report and Written Opinion of PCT Application No. PCT/JP2023/000693, issued on Feb. 28, 2023, 12 pages of ISRWO.
Lu, et al. ,"Transmission backlash of precise cable drive system", Proceedings of the Institution of Mechanical Engineers, Part C: Journal of Mechanical Engineering Science, vol. 227, Issue 10, Jan. 10, 2013, pp. 2254-2265.

* cited by examiner r2
r1
405
401
400
404
402
D
r1
401
405
404
402
400
r3
403

ARM DEVICE AND CABLE DECELERATION DEVICE

CROSS REFERENCE TO RELATED APPLICATIONS

This application is a U.S. National Phase of International Patent Application No. PCT/JP2023/000693 filed on Jan. 12, 2023, which claims priority benefit of Japanese Patent Application No. JP 2022-036461 filed in the Japan Patent Office on Mar. 9, 2022. Each of the above-referenced applications is hereby incorporated herein by reference in its entirety.

TECHNICAL FIELD

The technology disclosed in the present specification (hereinafter, "the present disclosure") relates to an arm device including an active joint with one or more degrees of freedom and relates to a cable deceleration device used for the arm device and the like, the arm device being applied to a remote operation robot used in various fields including a medical field and an industrial field, an operation console device for remote operation of a robot or input of an information device, and the like.

BACKGROUND ART

For example, a surgical robot used in a medical field includes an arm device on which an end effector including a surgical tool and an observation device (an endoscope or the like) is mounted at a distal end. In addition, an operation console device for remotely operating a slave robot on a master side in a master-slave system includes an arm device that supports an operation interface such as a handle on which an operator can perform input operation such as gripping. These arm devices basically have an articulated link structure, and at least some joints are configured as active joints in order to drive the end effector or give a force sense feedback to the operator.

Here, the active joint is driven by an actuator such as a motor. For example, in a case of a rotary motor, in order to output a larger rotational torque, the diameter is increased or a rotation axis is increased in length. However, the arm device also increases in size due to the increase in size of the motor. As a result, in each application field, there arises a problem that application to a minute surgical robot such as fundus surgery is not possible, and performing an input operation with both hands close to each other is difficult due to an increase in size of the operation console device operated by the left and right hands. Therefore, there is a general use form in which a deceleration device is attached to an output shaft of a small motor to convert the rotational torque into a rotational torque of a required size.

A deceleration device using a gear mechanism has problems of backlash and backdrivability. In contrast, a cable deceleration mechanism can achieve backlashlessness and high backdrivability, and is also suitable for, for example, a surgical robot or the like that requires precise force control. The cable deceleration mechanism includes an input capstan attached to an output shaft of a motor, an output capstan disposed to circumscribe the input capstan, and a cable wound around the input capstan and the output capstan (see, for example, Non-Patent Document 1). For example, a reaction force presentation type force sense interface disclosed in Patent Document 1 includes a cable deceleration structure in which "a vertically oriented first threaded capstan 413 being driven manipulates a first cable 453 (FIG. C). The first cable is secured at, at least two points 455*a* and 455*b* (FIG. 8C), to the horizontally oriented first powered tracked rotary element 14, and thus rotates the first element 14 about the A axis".

CITATION LIST

Patent Document

Patent Document 1: Japanese Patent Application Laid-Open No. 2011-44185, paragraph 0040, FIG. 8

Patent Document 2: Japanese Patent Application Laid-Open No. 2021-41038

Non-Patent Document

Non-Patent Document 1: Lu, Y, Fan, D. "Transmission backlash of precise cable drive system." (Proc IMechE, Part C: J Mechanical Engineering Science 2013; 227: 2256-2267)

SUMMARY OF THE INVENTION

Problems to be Solved by the Invention

An object of the present disclosure is to provide an arm device in which a cable deceleration structure is applied to an active joint, and a cable deceleration device used for the arm device and the like.

Solutions to Problems

The present disclosure has been made in view of the above problems, and a first aspect of the present disclosure is an arm device including one or more active shafts, the arm device including an input capstan attached to an output shaft of a motor for driving at least one active shaft of the one or more active shafts, an output capstan attached to the at least one active shaft, an idler pulley disposed between the input capstan and the output capstan, and a cable wound around an outer periphery of each of the input capstan and the output capstan via the idler pulley. The idler pulley is adjacent to the output capstan.

The arm device according to the first aspect may further include a first output capstan and a second output capstan rotatable about a common active shaft, a first cable deceleration mechanism that transmits rotation of a first motor to the first output capstan by using a first input capstan and a first idler pulley attached to an output shaft of the first motor, and a second cable deceleration mechanism that transmits rotation of a second motor to the second output capstan by using a second input capstan and a second idler pulley attached to an output shaft of the second motor. In this case, the first motor is disposed in a direction of the second output capstan or to overlap with the second output capstan, and the second motor is disposed in a direction of the first output capstan or to overlap with the first output capstan, so that the entire arm device can be downsized.

Furthermore, a second aspect of the present disclosure is a cable deceleration device including an input capstan attached to an output shaft of a motor, an output capstan disposed apart from the input capstan, an idler pulley disposed between the input capstan and the output capstan, and a cable wound around an outer periphery of each of the input capstan and the output capstan via the idler pulley.

Effects of the Invention

The present disclosure can provide an arm device in which a cable deceleration structure having an improved degree of freedom in arrangement of a motor is applied to an active joint, and a cable deceleration device in which the degree of freedom in arrangement of the motor is improved while a deceleration ratio is not reduced and a movable range is maintained.

Note that, effects described in the present specification are merely examples, and the effects brought about by the present disclosure are not limited thereto. Furthermore, there is also a case in which the present disclosure further has an additional effect in addition to the above-described effect.

Other objects, characteristics, and advantages of the present disclosure will become apparent from more detailed description based on an embodiment that will be described later and the accompanying drawings.

MODE FOR CARRYING OUT THE INVENTION

Hereinafter, the present disclosure will be described in the following order with reference to the drawings.

A. System configuration

B. Configuration of degree of freedom of arm device

C. Overview of present disclosure

D. Modification of arrangement pattern of idler pulley

E. Specific configuration example of arm device

A. System Configuration

An arm device of the present disclosure can be applied to a slave robot that operates on a slave side and an operation console device for remotely operating the slave robot on a master side in, for example, a master-slave system. In addition, such a master-slave system can be introduced into various industrial fields including a medical field. In this section A, the master-slave system to which the present disclosure is applicable will be described.

Figure 1:
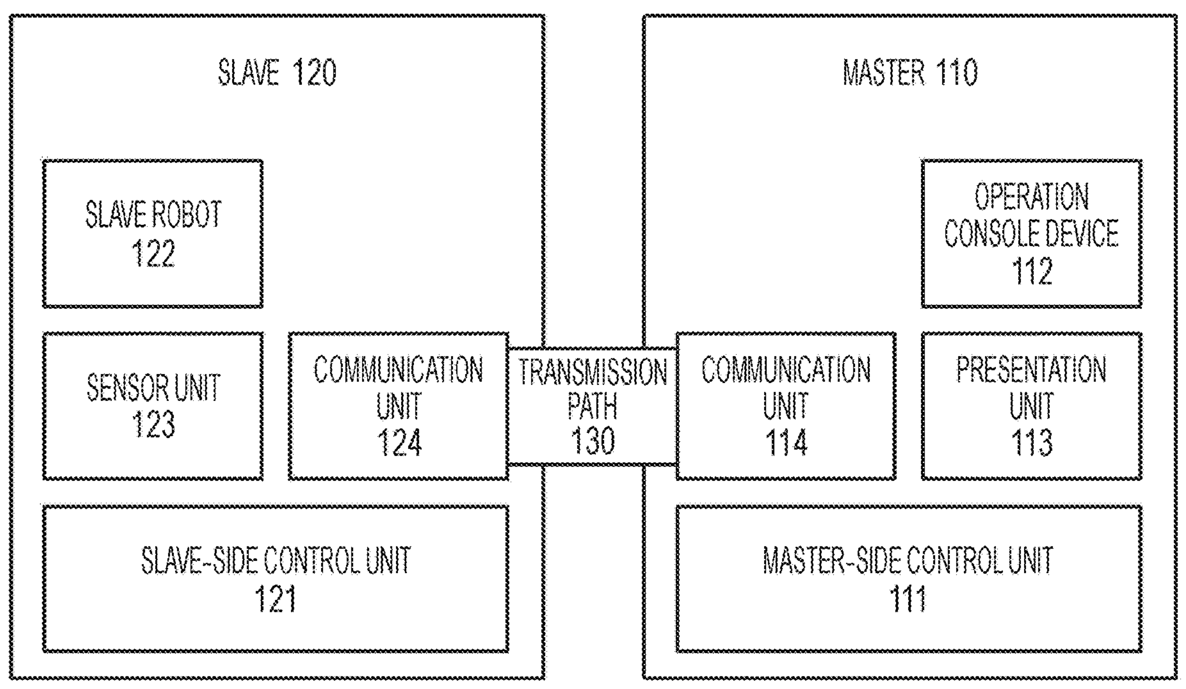
FIG. 1 is a diagram illustrating a functional configuration example of a master-slave system 100.
Figure 1:

FIG. 1 schematically illustrates a functional configuration example of a master-slave system 100. The master-slave system 100 illustrated in the drawing includes a master 110 having an operation console device as a master and a slave 120 having the slave robot. In a case where the master-slave system 100 is applied to surgery, a user such as an operator operates an operation console device on the master 110 side, and driving of the slave robot 122 such as a surgical manipulator is controlled in accordance with the operation of the user on the side of the slave 120 installed in an operating room, so that the surgery can be performed.

The master 110 is installed outside the operating room (alternatively, a place separated from an operating table in the operating room), for example, and the user (operator)

remotely operates the slave 120. The slave 120 includes the slave robot 122 such as a surgical manipulator installed near the operating table. The slave robot 122 has an articulated link structure, and has a distal end on which an end effector such as a surgical tool or an observation device is loaded. The surgical tool referred to herein is, for example, a medical instrument such as a pair of forceps, a pneumoperitoneum tube, an energy treatment tool, a pair of tweezers, or a retractor, and the observation device is, for example, an endoscope. Then, the slave robot 122 performs surgery for a patient laid on the operating table in accordance with an instruction from the master 110. Examples of the surgery described herein include a laparoscopic surgery, a celoscopic surgery, a brain surface surgery, and an eyeball or eyeground surgery. The master 110 and the slave 120 are interconnected via a transmission path 130. The transmission path 130 is desirably capable of performing signal transmission with a low delay by using, for example, a medium such as an optical fiber.

The master 110 includes a master-side control unit 111, an operation console device 122, a presentation unit 113, and a master-side communication unit 114. The master 110 operates under the overall control of the master-side control unit 111.

The operation console device 122 is an input device for a user (operator or the like) to perform a remote operation or an on-screen 3D operation for the slave robot 122 loaded with a surgical tool such as forceps in the slave 120. It is assumed that the operation console device 122 can perform operations of three degrees of freedom in translation for translating the surgical tool, three degrees of freedom in rotation for changing an orientation of the surgical tool, and one degree of freedom in gripping such as an opening/closing operation of the forceps, for example.

The presentation unit 113 presents information regarding surgery performed on the slave device 120 to the user (operator) operating the operation console device 122 on the basis of sensor information mainly acquired by a sensor unit 123 (described later) on the slave device 120 side.

For example, in a case where the sensor unit 123 on the slave 120 side is equipped with an RGB camera for observing a surface of an affected part, an RGB camera for capturing a microscopic image, an endoscope in laparoscopic or celoscopic surgery, or an interface for capturing captured images of these cameras, and these image data are transferred to the operation console device 112 with a low delay through the transmission path 130, the presentation unit 113 displays the captured image of the affected part of the affected part in real time on a screen by using a monitor display or the like.

Furthermore, in a case where the sensor unit 123 is equipped with a function to measure a force sense such as an external force or a moment acting on the surgical tool loaded on the slave robot 122, and such force sense information is transferred to the master 110 with a low delay via the transmission path 130, the presentation unit 113 performs force sense presentation to the user (operator). A force sense presentation function of the presentation unit 113 is incorporated and implemented in the operation console device 122. Specifically, the presentation unit 113 performs the force sense presentation to the user (operator) by driving a grip portion having, for example, three degrees of freedom in rotation and one degree of freedom in gripping of a tip of the operation console device 122 with a motor.

The master-side communication unit 114 performs signal transmission and reception processing with the slave 120 via the transmission path 130 under the control of the master-side control unit 111. For example, in a case where the transmission path 130 includes an optical fiber, the master-side communication unit 114 includes an electro-optical conversion unit that converts an electrical signal transmitted from the master 110 into an optical signal, and a photoelectric conversion unit that converts an optical signal received from the transmission path 130 into an electrical signal. The master-side communication unit 114 transfers an operation command for the slave robot 122 input by the user (operator) via the master 110 to the slave 120 via the transmission path 130. Furthermore, the master-side communication unit 114 receives the sensor information transmitted from the slave 120 via the transmission path 130.

On the other hand, the slave 120 includes a slave-side control unit 121, a slave robot 122, a sensor unit 123, and a slave-side communication unit 124. The slave 120 operates in accordance with an instruction from the master 110 under the overall control of the slave-side control unit 121.

The slave robot 122 is, for example, an arm type surgical robot having an articulated link structure, and is loaded with a surgical tool and an observation device, as an end effector at a tip (or a distal end). Examples of the surgical tools include forceps, pneumoperitoneum tubes, energy treatment tools, tweezers, and retractors. Furthermore, an example of the observation device includes an endoscope. The slave-side control unit 121 interprets the operation command transmitted from the master 110 via the transmission path 130, converts the operation command into a drive signal of an actuator that drives the slave robot 122, and outputs the drive signal. Then, the slave robot 122 operates on the basis of the drive signal from the slave-side control unit 121.

The sensor unit 123 includes a plurality of sensors for detecting a status in an affected area of the operation performed by the slave robot 122 or the slave robot 122, and further includes an interface for taking in sensor information from various sensor devices installed in the operating room. For example, the sensor unit 123 includes a force torque sensor (FTS) for measuring an external force and a moment acting during the operation on a surgical tool loaded at the tip (distal end) of the slave robot 122. Furthermore, the sensor unit 123 is equipped with an observation device such as an RGB camera for observing a surface of an affected part during surgery by the slave robot 122, an RGB camera for capturing a microscopic image, or an endoscope in laparoscopic or celoscopic surgery, or is equipped with an interface for capturing captured images of these cameras.

The slave-side communication unit 124 performs signal transmission and reception processing with the master 110 via the transmission path 130 under the control of the slave-side control unit 121. For example, in a case where the transmission path 130 includes an optical fiber, the slave-side communication unit 124 includes an electro-optical conversion unit that converts an electrical signal transmitted from the slave device 120 into an optical signal, and a photoelectric conversion unit that converts an optical signal received from the transmission path 130 into an electrical signal.

The slave-side communication unit 124 transfers the haptic data of the surgical tool acquired by the sensor unit 123, an RGB camera for observing the surface of the affected part, an RGB camera for capturing a microscopic image, and a captured image of an endoscope or the like in laparoscopic or celoscopic surgery to the operation console device 112 through the transmission path 130. Furthermore, the slave-side communication unit 124 receives the operation command on the surgical manipulator 122 transmitted from the master 110 via the transmission path 130.

B. Configuration of Degree of Freedom of Arm Device

In this item B, a configuration of a degree of freedom of the arm device in a case of being applied to the medical field such as surgery will be described.

Figure 2:
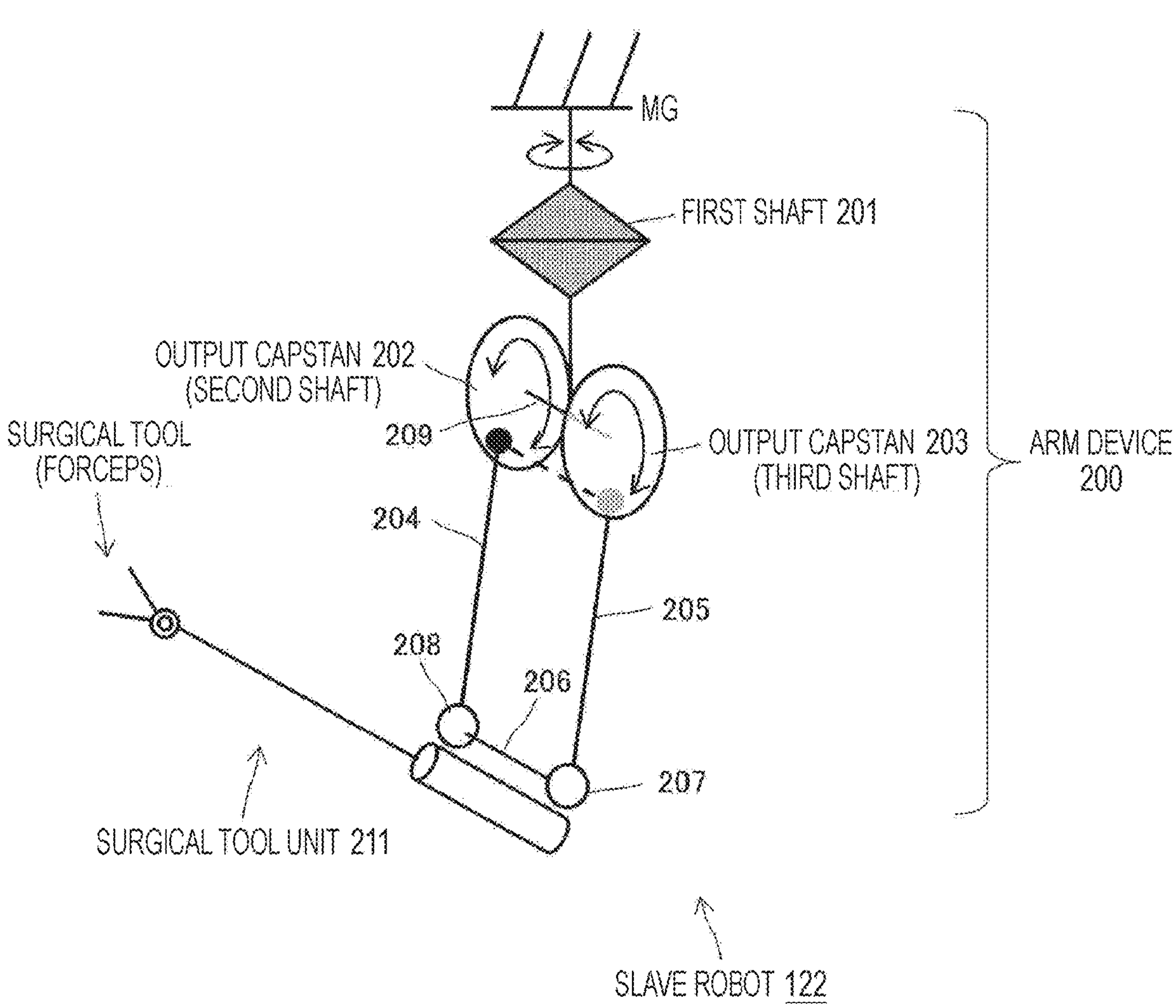
FIG. 2 is a diagram illustrating a configuration example of degrees of freedom of a slave robot 122.

FIG. 2 illustrates a configuration example of a degree of freedom of the slave robot 122 disposed on the slave 120 side in the master-slave system 100 illustrated in FIG. 1. The slave robot 122 includes a surgical tool unit 211 loaded with an end effector such as a surgical tool at the tip, and an arm device 200 that supports the surgical tool unit 211. The surgical tool unit 211 may be, but is not limited to, for example, a surgical tool unit disclosed in Patent Document 2. Since the present disclosure is not limited to a specific configuration of the surgical tool unit, the surgical tool unit is not described in detail in the present specification. Of course, a type of driving unit other than the surgical tool unit may be supported by the arm device 200.

Figure 3:
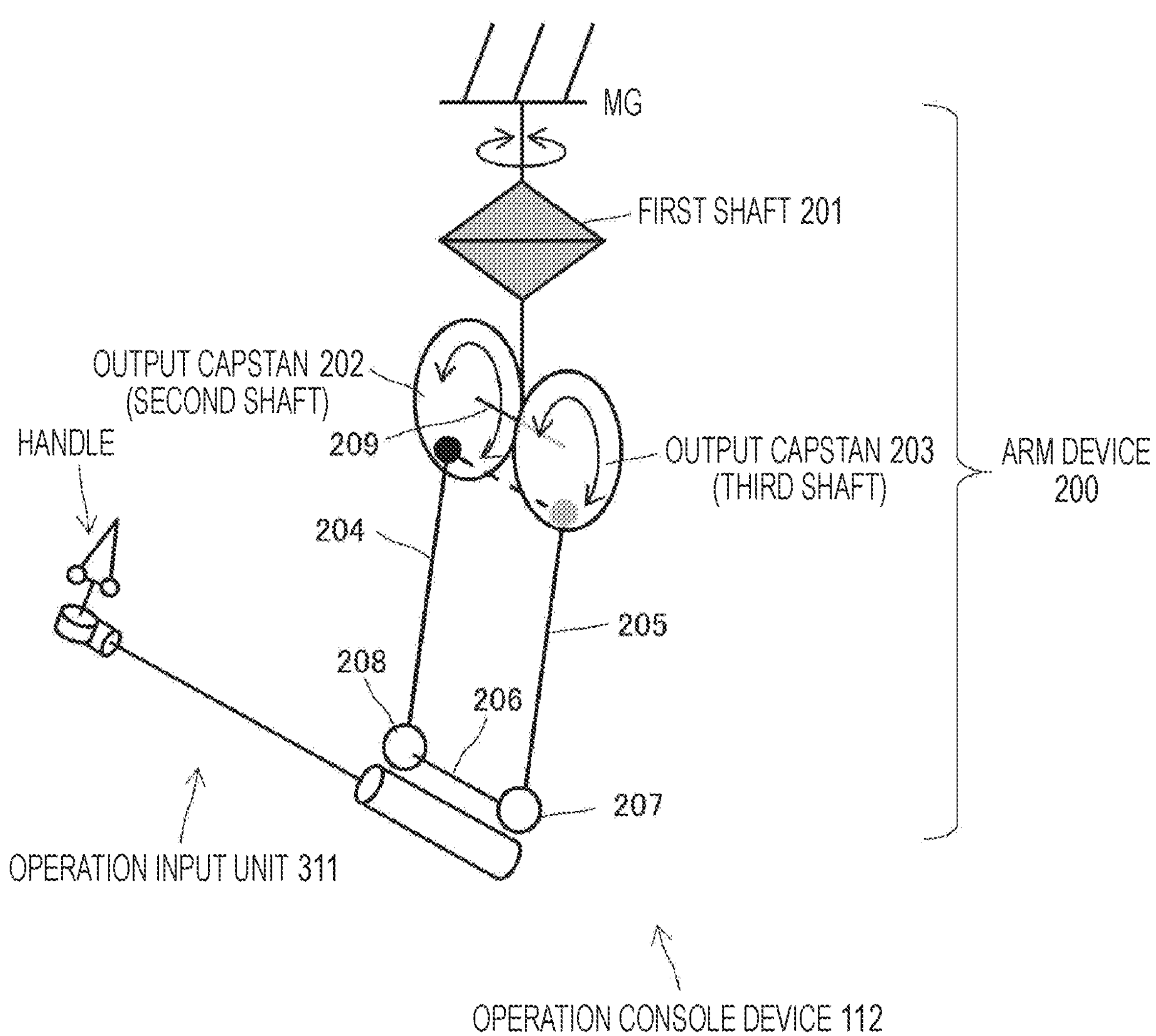
FIG. 3 is a diagram illustrating a configuration example of a degree of freedom of an operation console device 112.

In addition, FIG. 3 illustrates a configuration example of a degree of freedom of the operation console device 112 disposed on the master 110 side. The operation console device 112 includes an operation input unit 311 loaded with a handle at a tip with which a user performs an operation such as gripping, and the arm device 200 that supports the operation input unit 311. The operation console device 112 may be, for example, but not limited to, an "operation input device" described in Japanese Patent Application No. 2022-9750 already assigned to the present applicant. Since the present disclosure is not limited to a specific configuration of the operation console device, the operation console device 112 is not described in detail in the present specification. Of course, a type of operation unit other than the operation input device may be supported by the arm device 200.

The arm devices 200 applied on each of the slave robot side and the operation console device 112 side are different in size depending on an application, a purpose of use, and the like. However, for convenience of description, the arm devices 200 used on the slave robot 122 side and the operation console device side have the same configuration of the degree of freedom. In the examples illustrated in FIGS. 2 and 3, it is assumed that the arm device 200 is suspended from a ceiling that is a mechanical ground (MG).

The arm device 200 includes a first shaft (pan shaft) 201 that rotates the body of the arm device 200 around a vertical pan shaft with respect to the mechanical ground, an output capstan 202 of a second shaft (first tilt shaft) coupled to an upper end of one tilt link 204, and an output capstan 203 of a third shaft (second tilt shaft) coupled to an upper end of another tilt link 205. The first shaft, the second shaft, and the third shaft are all active joints. Each of the first shaft, the second shaft, and the third shaft is configured to decelerate and drive a rotational output of a motor as a drive source by using a cable deceleration mechanism. Details will be described later.

The output capstan 202 and the output capstan 203 have a common rotation axis 209. The output capstan 202 rotatably supports an upper end portion of the tilt link 204 about an axis parallel to the rotation axis 209 at a position separated from the rotation axis 209 by a predetermined length in a radial direction. Similarly, the output capstan 203 rotatably supports an upper end portion of the tilt link 205 about an axis parallel to the rotation axis 209 at a position separated from the rotation axis 209 by the same distance in the radial direction. Then, a line (indicated by dotted lines in FIGS. 2 and 3) connecting the upper ends of the tilt link 204 and the tilt link 205 serves as a driving link of a parallel link mechanism.

Furthermore, the arm device 200 supports the surgical tool unit 211 (alternatively, the operation input unit 311) via a driven link 206 of the parallel link mechanism having the two tilt links 204 and 205 as intermediate links. The surgical tool unit 211 (alternatively, the operation input unit 311) is connected to the parallel link mechanism (alternatively, the arm device 200) via joint shafts 207 and 208 at both ends of the driven link 206. In an implementation example described later, the surgical tool unit 211 (alternatively, the operation input unit 311) is fixed to a unit holder having the joint shafts 207 and 208. It is assumed that the joint shafts 20707 and 208 are both passive joints. The tilt link 204 and the tilt link 205 are arranged to be line-symmetric with respect to a straight line passing through the rotation axis 209, and this line-symmetric relationship is maintained during driving of the arm device 200.

Driving the first shaft 201 can cause the arm device 200 to perform a pan operation about the first shaft 201. In addition, rotationally driving the output capstan 202 and the output capstan 203 about the rotation axis can cause the driven link 206 and the surgical tool unit 211 (alternatively, the operation input unit 311) attached to the driven link 206 to perform a tilting operation.

The tilting operation by the arm device 200 will be specifically described. The output capstan 202 and the output capstan 203 are rotated in the same rotation direction by the same rotation angle, and then, the parallel link mechanism rotates together about the rotation axis 209 in the same orientation, and the driven link 206 and the surgical tool unit 211 (alternatively, the operation input unit 311) attached to the driven link 206 can be tilted about the rotation axis 209 (which is referred to as "first tilting operation". The tilt link 204 and the tilt link 205 are arranged to be line-symmetric with respect to a straight line passing through the rotation axis 209, but the orientations of the tilt link 204 and the tilt link 205 with respect to the rotation axis 209 do not change during the first tilting operation.

Furthermore, the output capstan 202 and the output capstan 203 are rotated so that the rotation angle about the rotation axis 209 changes, the orientation of the parallel link mechanism changes, and the surgical tool unit 211 (alternatively, the operation input unit 311) can be tilted while being at such a position as to be suspended by the tilt links 204 and 205 (which is referred to as a second tilting operation). During the second tilting operation, the orientations of the tilt link 204 and the tilt link 205 with respect to the rotation axis 209 change, but the relationship in which the tilt link 204 and the tilt link 205 are line-symmetric with respect to the straight line passing through the rotation axis 209 is maintained.

C. Overview of Present Disclosure

In a case where the arm device 200 is applied to the medical field such as surgery, for example, precise force control is required on both the master side 110 side and the slave side 120. Therefore, a method of achieving backlash-lessness and high backdrivability by applying the cable deceleration mechanism to each of the first to third shafts which are active joints in the arm device 200 will be considered.

Figure 22:
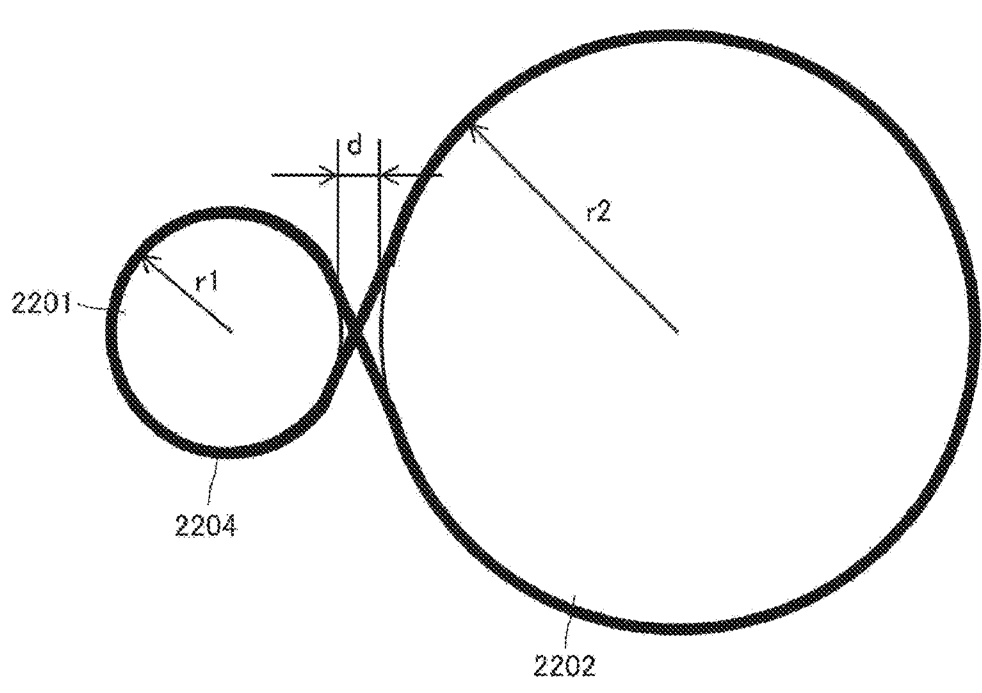
FIG. 22 is a diagram illustrating a basic principle of a cable deceleration mechanism 2200.
Figure 22:
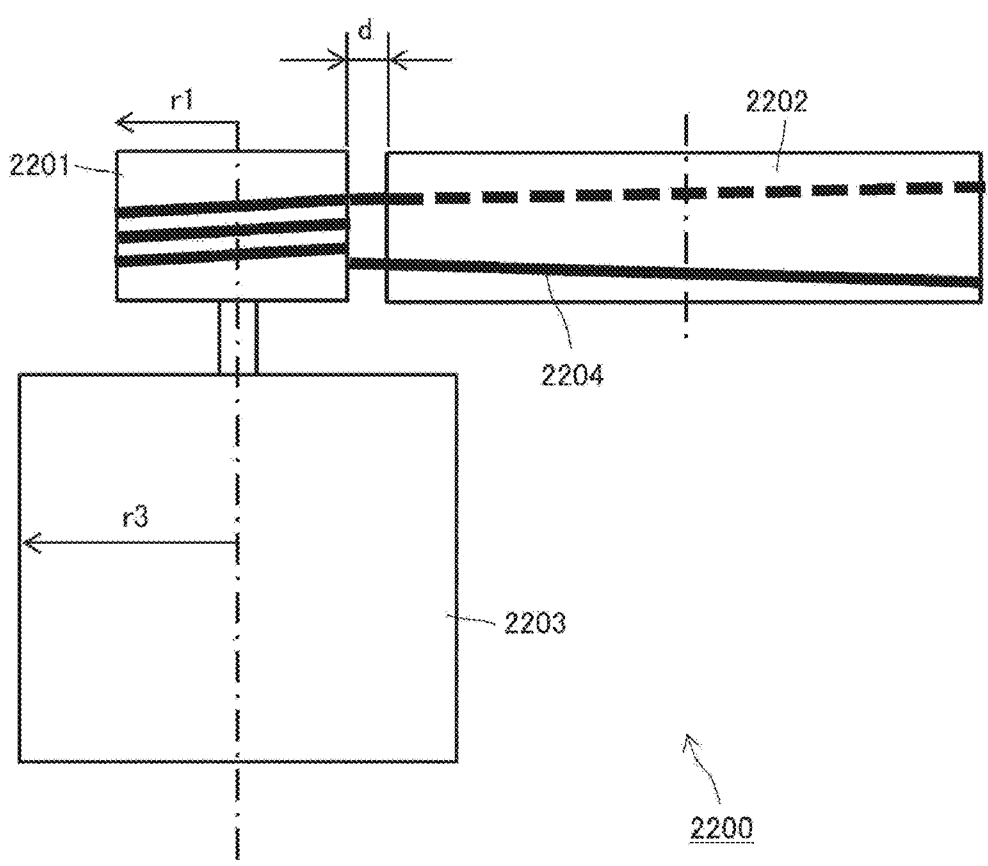

FIG. 22 illustrates a basic principle of a cable deceleration mechanism 2200. However, an upper part of the drawing illustrates a top view of the cable deceleration mechanism 2200 as viewed from a rotation axis direction of the motor and each capstan, and a lower part of the drawing illustrates a side view of the cable deceleration mechanism 2200 as viewed from a lateral direction orthogonal to the rotation axis.

The cable deceleration mechanism 2200 illustrated in the drawing includes an input capstan 2201 attached to an output shaft of a motor 2203, an output capstan 2202 disposed to circumscribe the input capstan 2201, and a cable 2204 wound around the input capstan 2201 and the output capstan 2202 (see, for example, Non-Patent Document 1). However, in the drawing, a small interval (clearance in the radial direction) d is provided between outer peripheries of the input capstan 2201 and the output capstan 2202.

By making a radius r2 of the output capstan 2202 larger than a radius r1 of the input capstan 2201, it is possible to function as a decelerator. That is, a deceleration ratio of the cable deceleration mechanism 2200 is determined by a ratio of the radius r1 of the input capstan 2201 and the radius r2 of the output capstan 2202. Here, a radius r3 of the motor 2203 is large in order to output a rotational torque equal to or greater than a predetermined value. Furthermore, if the motor is integrated with an encoder or a brake (neither is illustrated), then, the radius r3 of the entire unit of the motor 2203 is inevitably equal to or greater than a predetermined size. Therefore, in a layout in which $r3>r1+d$ is satisfied and the output capstan 2202 circumscribes the input capstan 2201, it is necessary to arrange the motor 2203 so as not to interfere with the output capstan 2202.

Incidentally, by making the radius r1 of the input capstan 2201 larger than the radius r3 of the motor 2203 (or $r3<r2+d$), the interference of the motor 2203 with the output capstan 2202 and other mechanical components is avoided, and the degree of freedom of the arrangement of the motor 2203 is improved, but the deceleration ratio decreases. That is, it is not preferable to change the radius r1 of the input capstan 2201 in order to maintain the deceleration ratio of the cable deceleration mechanism 2200.

Figure 23:
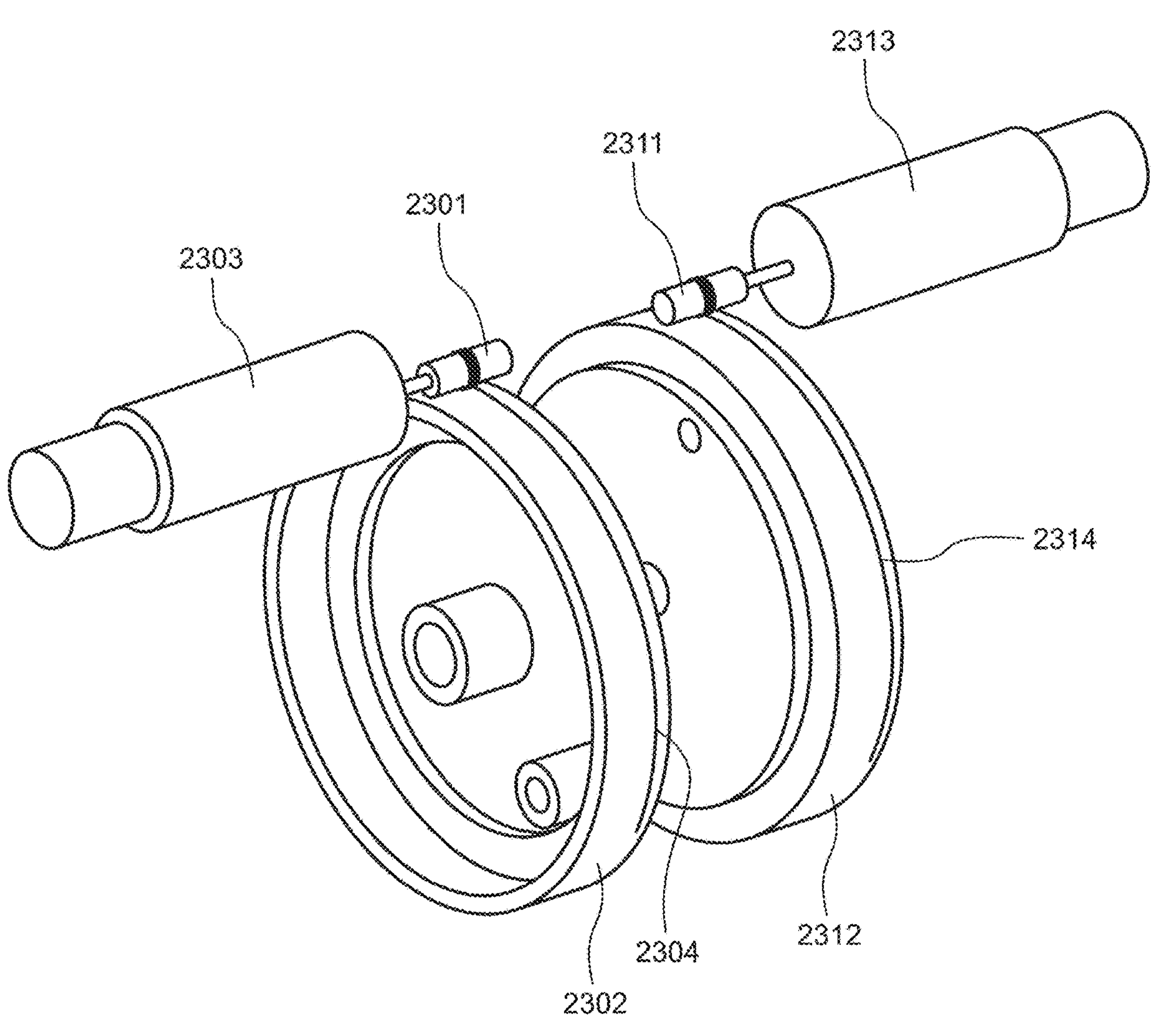
FIG. 23 is a diagram illustrating an example in which the cable deceleration mechanism illustrated in FIG. 22 is applied.
Figure 24:
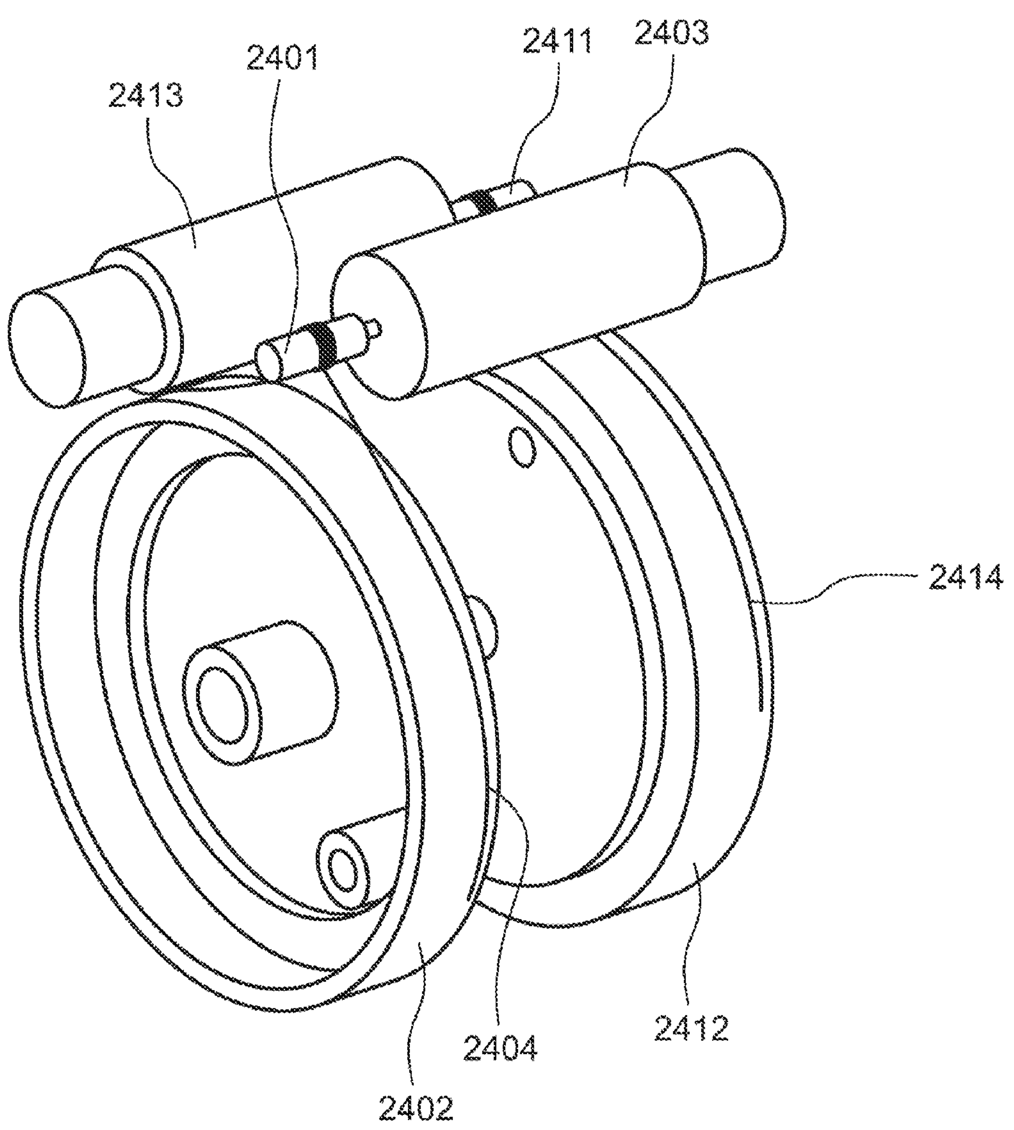
FIG. 24 is a diagram illustrating another example in which the cable deceleration mechanism illustrated in FIG. 22 is applied.
Figure 25:
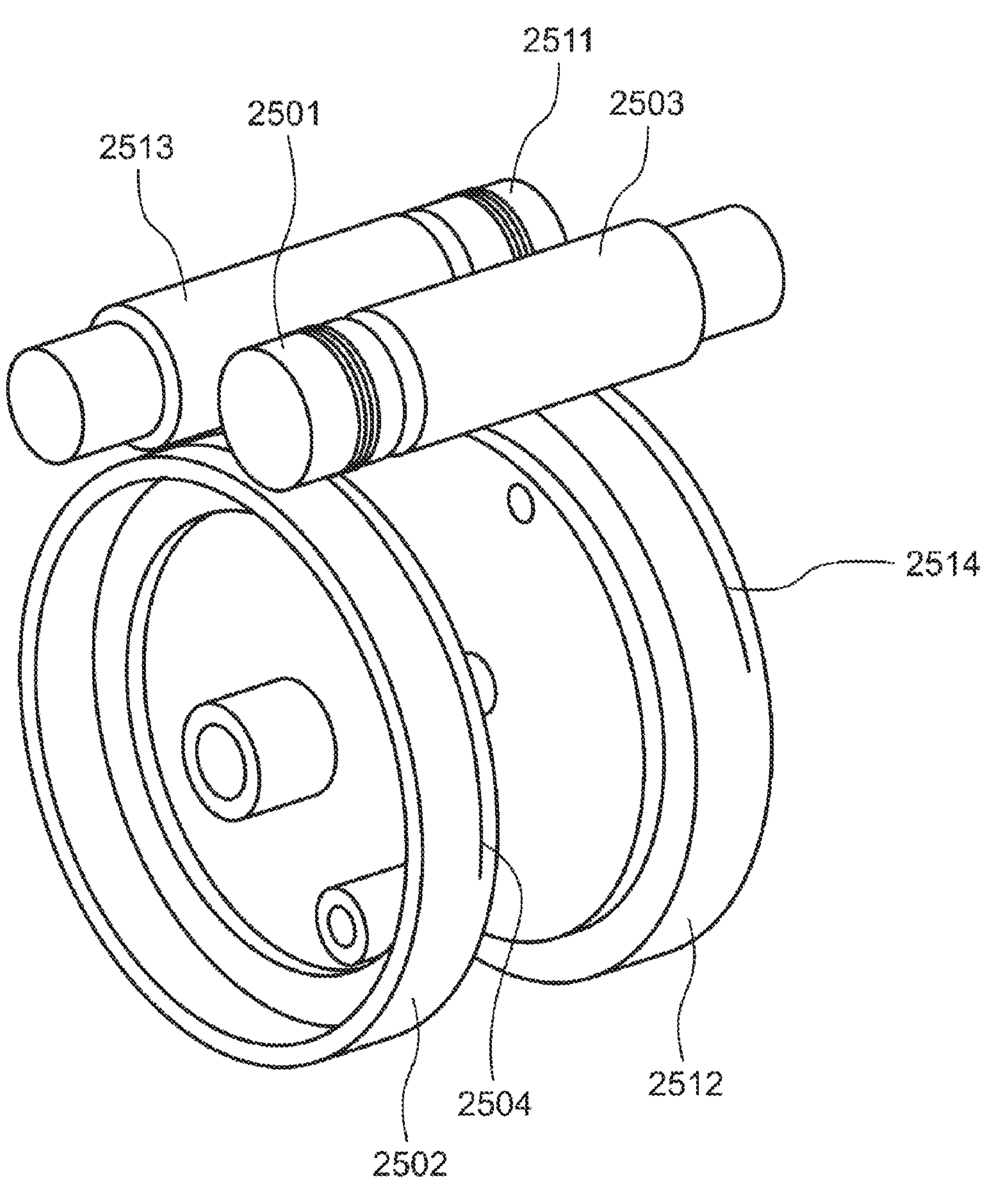
FIG. 25 is a diagram illustrating still another example in which the cable deceleration mechanism illustrated in FIG. 22 is applied.

In the arm device 200 illustrated in FIGS. 2 and 3, the two output capstans 202 and 203 are arranged so as to have the common rotation axis 209 (that is, so as to be coaxial). By applying the cable deceleration mechanism to each of the output capstans 202 and 203 and the active shaft of the arm device 200, it is possible to achieve backlashlessness and high backdrivability. However, it is necessary to design the layout so that the motors for driving the output capstans do not interfere with each other. FIGS. 23 to 25 illustrate examples in which a cable deceleration mechanism is applied to drive of two output capstans having a common rotation axis.

In the example illustrated in FIG. 23, a motor 2303, which is a drive source of one output capstan 2302, is disposed outward (alternatively, so as not to overlap with another output capstan 2312) so that an input capstan 2301 attached to the output shaft circumscribes the output capstan 2302. Then, the rotation of a motor 2303 is transmitted to the output capstan 2302 by a cable 2304 wound around the input capstan 2301 and the output capstan 2302. Similarly, the motor 2313, which is a drive source of the another output capstan 2312, is disposed outward (alternatively, so as not to overlap with another output capstan 2392) so that the input capstan 2311 attached to the output shaft circumscribes the output capstan 2312. Then, the rotation of the motor 2313 is transmitted to the output capstan 2312 by the cable 2314 wound around the input capstan 2311 and the output capstan 2312.

According to the layout as illustrated in FIG. 23, since one motor 2303 is disposed on the opposite side of another output capstan 2311 and another motor 2313 is also disposed in the opposite direction of the one output capstan 2301, the one motor does not interfere with the other output capstan. However, the size of the entire arm device increases by at least a total length of the motor 2303 and the motor 2313 in the rotation axis direction of the input capstans 2301 and 2311.

FIG. 24 illustrates a layout in which the motor 2403, which is a drive source of one output capstan 2402, is disposed inward (alternatively, so as to overlap with another output capstan 2412), and the motor 2413, which is a drive source of the another output capstan 2412, is disposed inward (alternatively, so as to overlap with the one output capstan 2402). The arrangement relationship between the input capstan 2401 and the output capstan 2402, the arrangement relationship between the input capstan 2411 and the output capstan 2412, and the layout of each of cables 2404 and 2414 are similar to those in FIG. 23.

In the example illustrated in FIG. 24, by increasing a clearance in the radial direction between the input capstan 2401 and the output capstan 2402, although the motor 2403 is disposed inward, interference with the another output capstan 2412 is avoided. Similarly, by increasing a clearance in the radial direction between the input capstan 2411 and the output capstan 2412, although the motor 2413 is disposed inward, interference with the one output capstan 2402 is avoided. Therefore, the size of the entire arm device is not increased due to a cable drive mechanism. However, as a result of increasing the clearance in the radial direction, a region where the cable 2404 floats from an outer periphery of the output capstan 2402 increases, and thus, a movable range that can be used as a decelerator decreases. Similarly, since a region where the cable 2414 floats from an outer periphery of the output capstan 2412 increases, the movable range that can be used as a decelerator decreases.

Furthermore, similarly to FIG. 24, FIG. 25 illustrates a layout in which a motor 2503, which is a drive source of one output capstan 2502, is disposed inward (alternatively, so as to overlap with another output capstan 2512), and the motor 2513, which is a drive source of the another output capstan 2512, is disposed inward (alternatively, so as to overlap with the one output capstan 2502). The arrangement relationship between the input capstan 2501 and the output capstan 2502, the arrangement relationship between an input capstan 2511 and the output capstan 2512, and the layout of each of cables 2504 and 2514 are similar to those in FIG. 24.

In the example illustrated in FIG. 25, the radius of the input capstan 2501 is the same as or larger than the radius of the motor 2503 so as not to interfere with the another output capstan 2512 even when the motor 2503 is directed inward, and the radius of the input capstan 2512 is larger than the radius of the motor 2513 so as not to interfere with the another output capstan 2502 even when the motor 2513 is directed inward (where the radius of the motor is a radius including an integrated encoder and brake). Therefore, the size of the entire arm device is not increased due to a cable drive mechanism. However, since the radius of the input capstan needs to be increased, the deceleration ratio of each cable deceleration mechanism decreases.

On the other hand, the present disclosure proposes a cable deceleration mechanism configured such that an idler pulley is inserted between an input capstan and an output capstan, and a power transmission cable is wound around each of the input capstan and the output capstan via the idler pulley. In the cable deceleration mechanism of the present disclosure, the idler pulley is interposed to adjust the layout of the cable while maintaining the deceleration ratio and keeping the radius of the input capstan small, so that a sufficient clearance can be provided in the radial direction between the motor and the output capstan to avoid interference by the motor.

In addition, in the cable deceleration mechanism of the present disclosure, since the power transmission cable is wound around each of the input capstan and the output capstan via the idler pulley, even if the distance between the input capstan and the output capstan becomes long, by arranging one or a plurality of idler pulleys to adjust the layout of the cable, it is possible to prevent a region where the cable floats from the outer periphery of the output capstan from being increased. It is therefore possible to provide a sufficient clearance in the radial direction between the motor and the output capstan while maintaining the movable range of the cable deceleration mechanism and to avoid interference by the motor.

Note that terms used in the present specification will be briefly described. The "capstan" and the "idler pulley" are both pulleys. A pulley used for cable layout adjustment and application of tension to the cable is referred to as an "idler pulley" in the present specification. Furthermore, a pulley used for application of power to the cable or conversely for conversion of a force from the cable into an axial force is referred to as a "capstan" in the present specification, and an input capstan and an output capstan are both pulleys used in this application.

A basic principle of a cable deceleration mechanism 400 to which the present disclosure is applied will be described with reference to FIG. 4. However, an upper part of the drawing illustrates a top view of the cable deceleration mechanism 400 as viewed from the rotation axis direction of the motor and each capstan, and a lower part of the drawing illustrates a side view of the cable deceleration mechanism 400 as viewed from the lateral direction orthogonal to the rotation axis.

The cable deceleration mechanism 400 illustrated in the drawing includes an input capstan 401 attached to an output shaft of a motor 403, an output capstan 402, an idler pulley 405 inserted between the input capstan 401 and the output capstan 402 so as to circumscribe each of the input capstan 401 and the output capstan 402, and a cable 404 wound around the input capstan 401 and the output capstan 402 via the idler pulley 405. The idler pulley 405 has a function of adjusting the layout of the cable 404 between the input capstan 401 and the output capstan 402.

Figure 4:
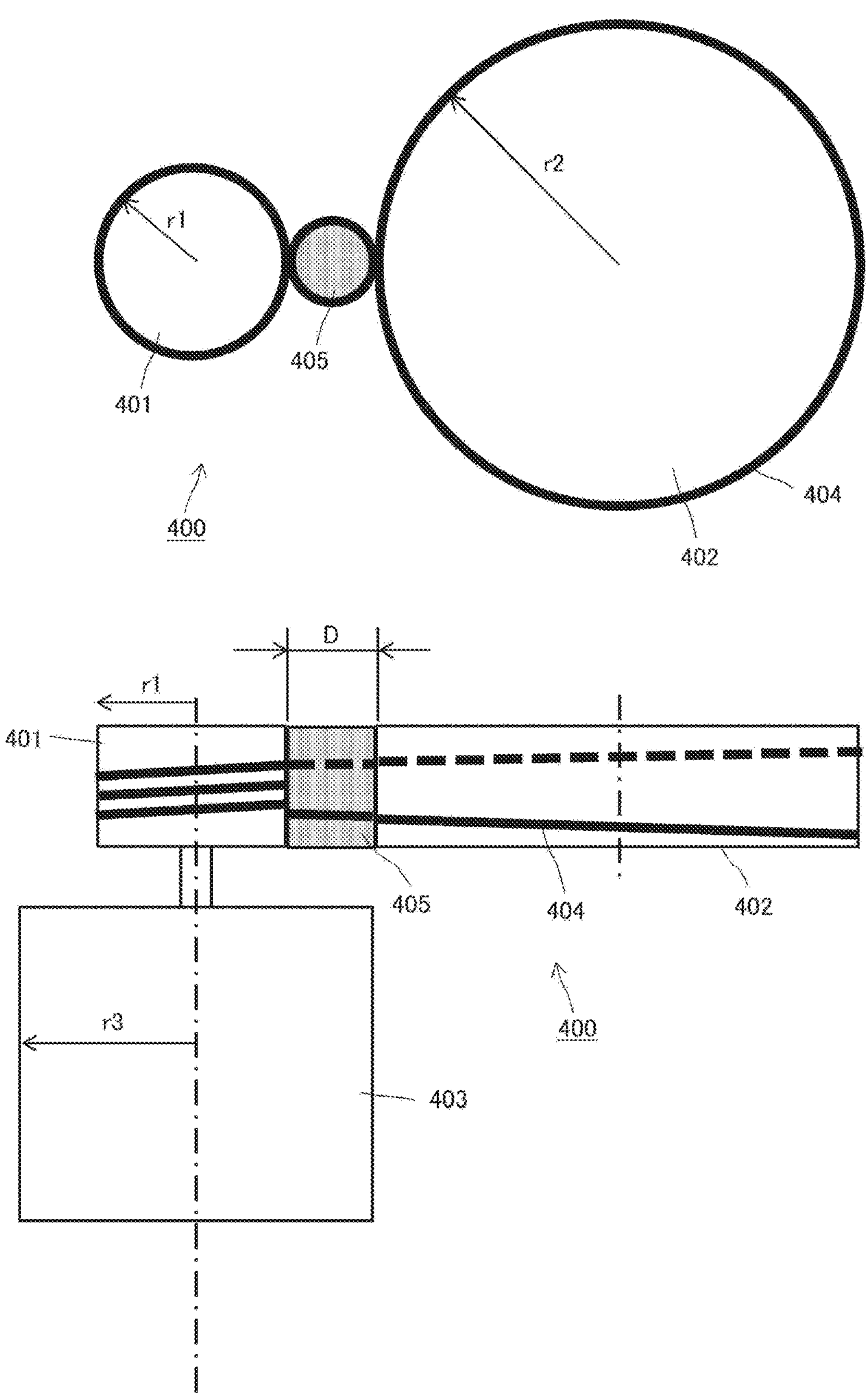
FIG. 4 is a diagram for describing a basic principle of a cable deceleration mechanism 400 to which the present disclosure is applied.

As illustrated in FIG. 4, by interposing the idler pulley 405, an interval D of an appropriate size corresponding to the outer shape of the idler pulley 405 can be provided between outer peripheries of the input capstan 401 and the output capstan 402. Since the cable 404 is wound around each of the input capstan 401 and the output capstan 402 via the idler pulley 405, although the input capstan 401 and the output capstan 404 are separated by a sufficient distance D, it is not necessary to increase a region where the cable 404 floats from the outer periphery of the output capstan 402. It is therefore possible to provide the sufficient clearance D in the radial direction between the motor 403 and the output capstan 402 while maintaining the movable range of the cable deceleration mechanism 400 and to avoid interference by the motor 403. The idler pulley 405 is disposed between the input capstan 401 and output capstan 402 spaced apart from each other and has the function of adjusting the layout of the cable 404 so as to reduce the region where the cable 404 floats from the outer periphery of the output capstan 402.

By making a radius r2 of the output capstan 402 larger than a radius r1 of the input capstan 401, it is possible to function as a decelerator. That is, a deceleration ratio of the cable deceleration mechanism 400 is determined by a ratio of the radius r1 of the input capstan 401 and the radius r2 of the output capstan 402, similarly to the cable deceleration mechanism 2200 illustrated in FIG. 22. Here, the radius r3 of the motor 403 is large in order to output a rotational torque equal to or greater than a predetermined value. Furthermore, if the motor is integrated with an encoder or a brake (neither is illustrated), then, the radius r3 is inevitably equal to or greater than a predetermined size. As illustrated in FIG. 4, since the sufficient clearance D can be provided in the radial direction between the motor 403 and the output capstan 402 by the interposition of the idler pulley 405, it is possible to avoid interference with the output capstan 402 and other peripheral components by the motor 403 having a larger diameter than the input capstan 401 (that is, to improve the degree of freedom in the arrangement of the motor 403) while maintaining the deceleration ratio and keeping the radius r1 of the input capstan 401 small.

Note that the number n of turns of the cable 404 around the input capstan 401 is $n=(r2/r1)(\theta/2\pi)$, where a movable rotation angle of the output capstan 402 is e (unit of which is radian). In a case where the deceleration ratio of the cable decelerator is large, the number n of turns of the cable 404 around the input capstan 401 is two or more. By cutting a spiral groove on the outer periphery of the input capstan 401 and winding the cable 404 along the groove, it is possible to prevent entanglement between adjacent cables having different numbers of windings.

Figure 5:
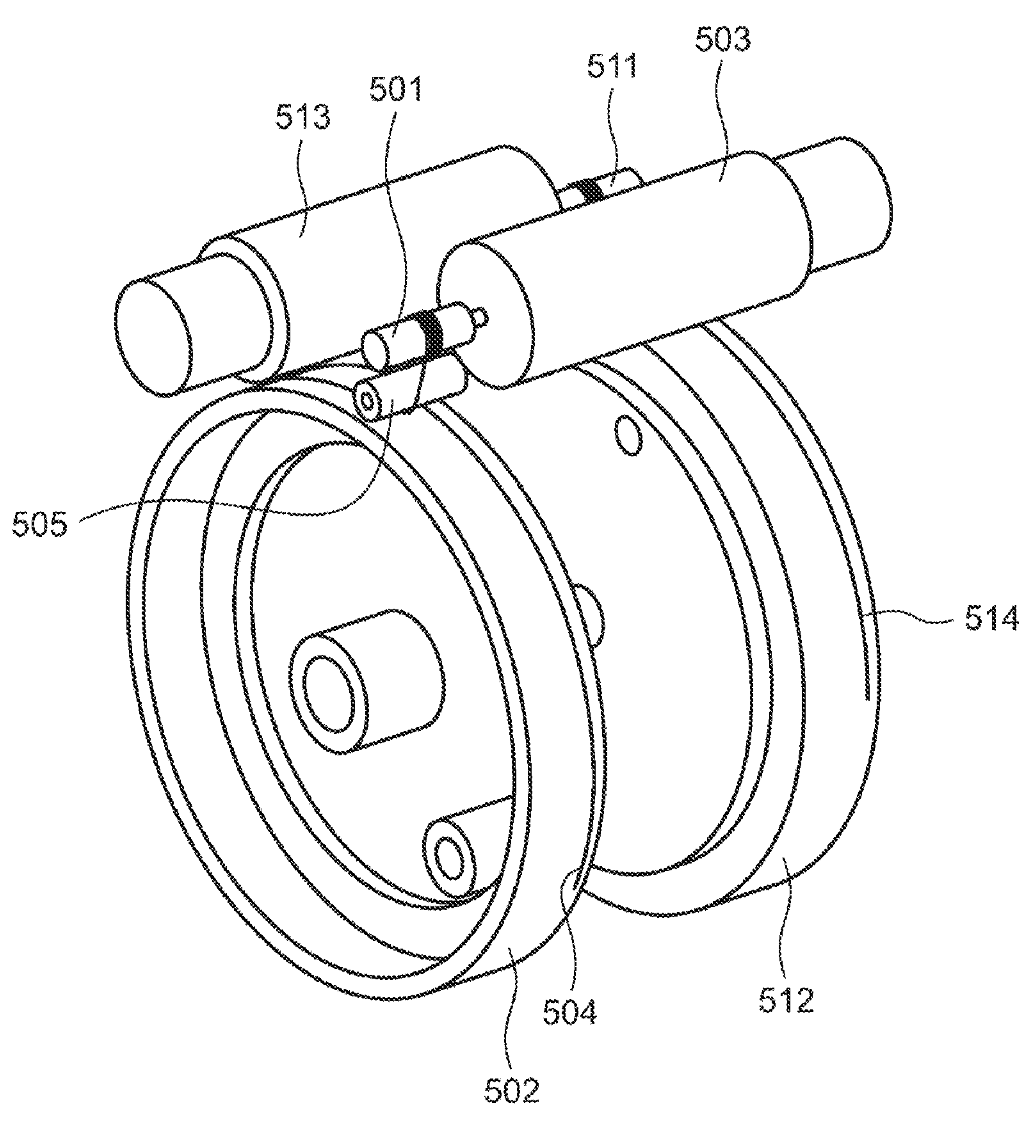
FIG. 5 is a diagram illustrating an example in which the cable deceleration mechanism of the present disclosure is applied to a coaxial output capstan.

FIG. 5 illustrates an example in which the cable deceleration mechanism of the present disclosure as illustrated in FIG. 4 is applied to the arm device 200 illustrated in FIGS. 2 and 3. As illustrated in FIGS. 2 and 3, in the arm device 200, the two output capstans 202 and 203 are arranged so as to have the common rotation axis 209 (that is, so as to be coaxial). In such a configuration, it is necessary to arrange the motors for driving the output capstans 202 and 203 so as not to increase the size of the entire arm device 200 and so as not to interfere with other components such as the output capstans 202 and 203.

In the example illustrated in FIG. 5, a motor 503, which is a drive source of one output capstan 502, is disposed inward (alternatively, so as to overlap with another output capstan 512), and a motor 513, which is a drive source of the other output capstan 512, is disposed inward (alternatively, so as to overlap with the one output capstan 502). Then, one cable deceleration mechanism is configured such that an idler pulley 505 is inserted between the input capstan 501 and the output capstan 502, and a cable 504 is wound around each of the input capstan 501 and the output capstan 502 via the idler pulley 505. Similarly, another cable deceleration mechanism is configured such that an idler pulley (not illustrated) is inserted between the input capstan 511 and the output capstan 512, and a cable 514 is wound around each of the input capstan 511 and the output capstan 512 via the idler pulley (not illustrated).

In one cable drive mechanism, since the clearance in the radial direction between the output capstan 502 and the input capstan 501 is sufficiently large due to the interposition of the idler pulley 505, the motor 503 can be disposed inward so as not to interfere with the another output capstan 512 (alternatively, so as to overlap with another output capstan 512). Similarly, in another cable drive mechanism, since the clearance in the radial direction between the output capstan 512 and the input capstan 511 is sufficiently large due to the interposition of the idler pulley (not illustrated), the motor 513 can be disposed inward so as not to interfere with the another output capstan 502.

In the case of the layout of the motors 503 and 513 exemplified in FIG. 5, the size of the entire device fits within the larger one of the distance between the pair of output capstan 502 and 512 or the length in the rotation axis direction of each of the motors 502 and 512. As illustrated in FIG. 23, the size of the entire arm device 200 can be significantly reduced as compared with a case where the total length of the motors 502 and 512 in the rotation axis direction is added to the distance between the output capstans 502 and 512.

In each of the output capstans 502 and 512, since the cables 504 and 514 are wound via the idler pulley 505 and the idler pulley (not illustrated), respectively, it is possible to increase both the clearance in the radial direction between the input capstan 501 and the output capstan 512 and the clearance in the radial direction between the input capstan 511 and the output capstan 512. As a result, unlike the example illustrated in FIG. 25, since the motors 503 and 513 can be disposed so as not to interfere with the input capstans 501 and 512 without increasing the radii of the output capstans 502 and 512, the deceleration ratio of each cable deceleration mechanism can be maintained.

In addition, since the cables 504 and 514 are wound around the output capstan 502 and 512 via the idler pulley 505 and the idler pulley (not illustrated), respectively, unlike the example illustrated in FIG. 24, it is not necessary to increase a region where the cables 504 and 514 float from the outer peripheries of the output capstan 502 and 512, respectively, and the movable range of each cable deceleration mechanism can be maintained.

Figure 26:
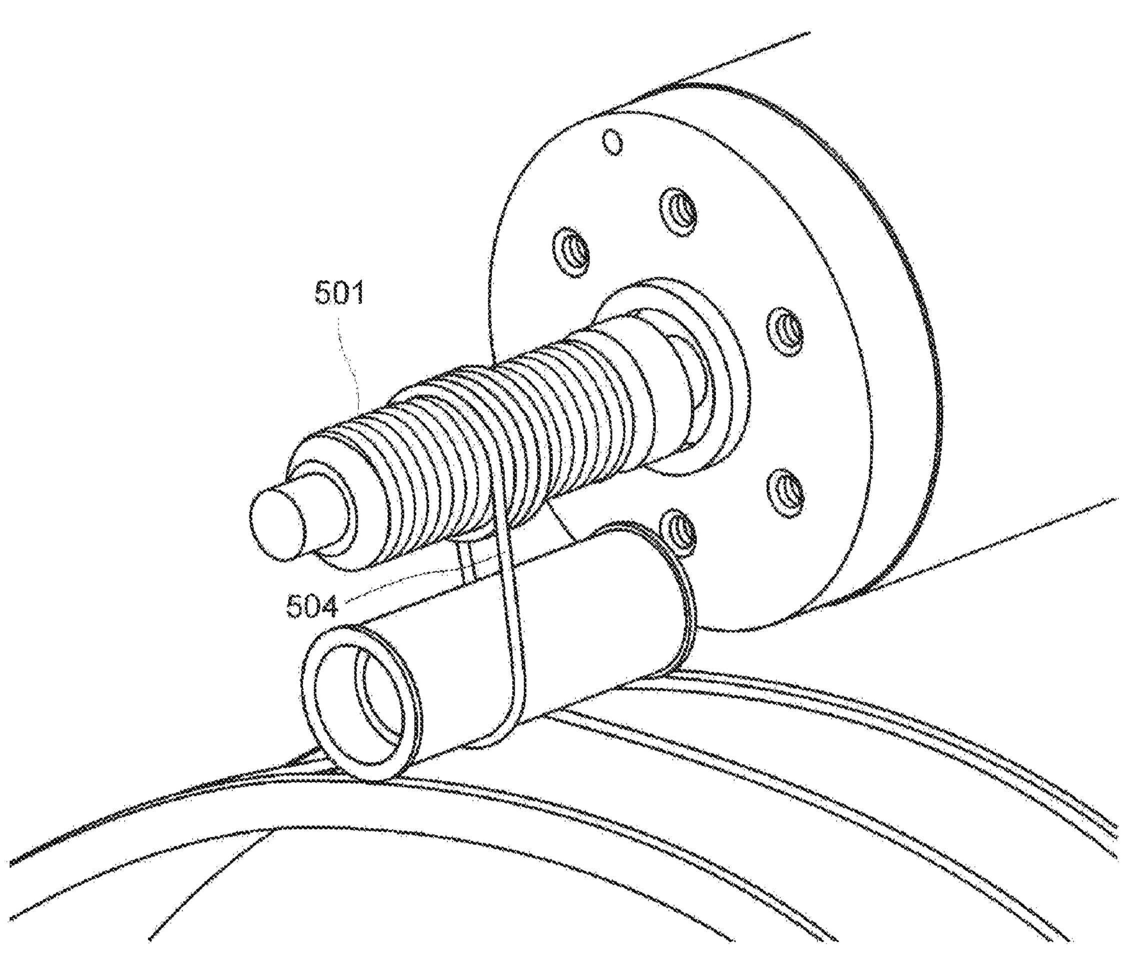
FIG. 26 is a diagram illustrating a state in which a spiral groove is dug in an outer periphery of an input capstan 501 and a cable 504 is wound along the groove.

Note that the number n of turns of the cable 504 around the input capstan 501 is $n=(r2/r1)(\theta/2\pi)$, where a movable rotation angle of the output capstan 502 is 0 (unit of which is radian). In a case where the deceleration ratio of the cable decelerator is large, the number n of turns of the cable 504 around the input capstan 501 is two or more. As illustrated in FIG. 26, by cutting a spiral groove on the outer periphery of the input capstan 501 and winding the cable 504 along the groove, it is possible to prevent entanglement between adjacent cables having different numbers of windings. A similar configuration applies to the another input capstan 511.

Figure 6:
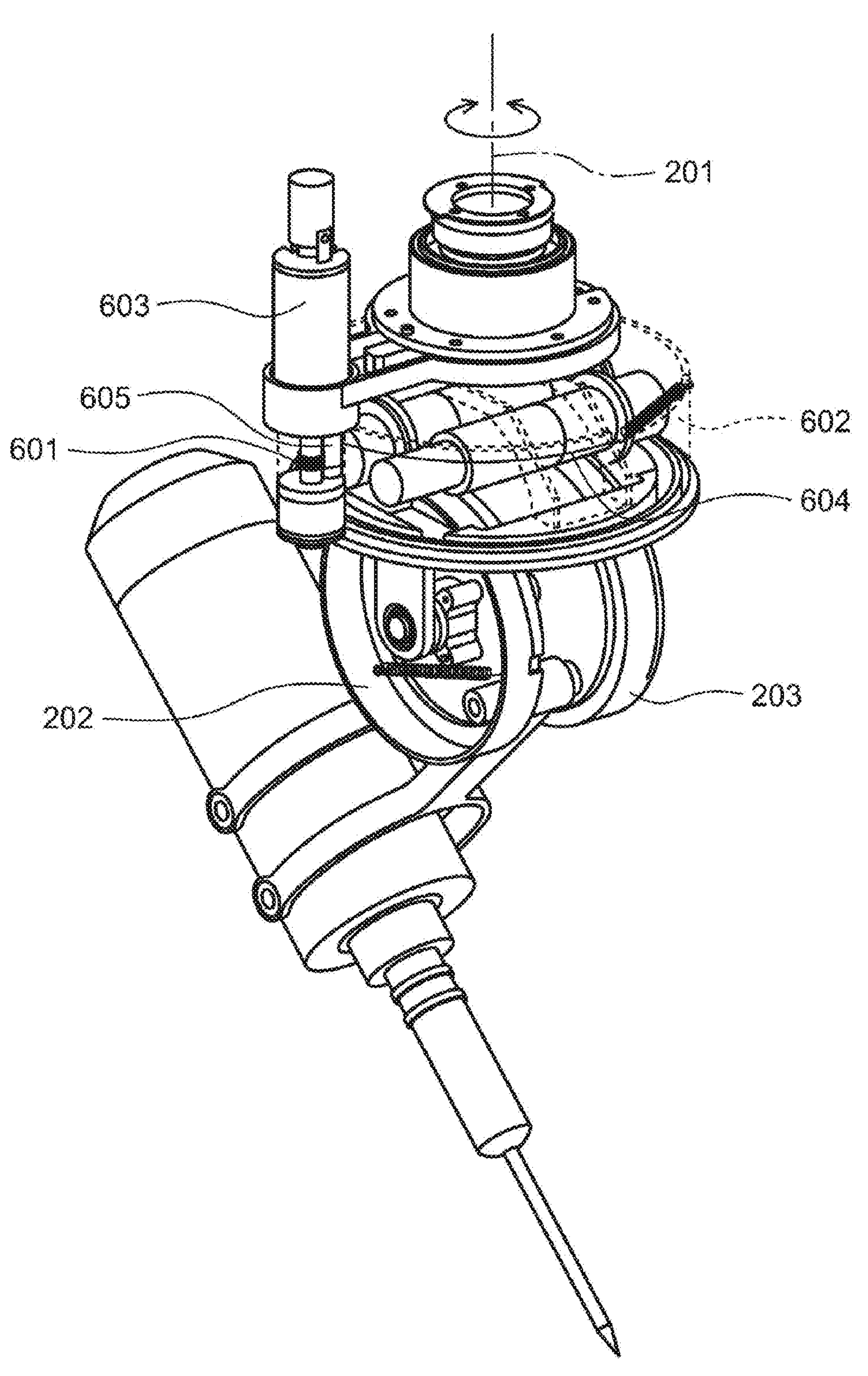
FIG. 6 is a diagram illustrating an example in which the cable deceleration mechanism of the present disclosure is applied to each active shaft of an arm device 200.

FIG. 6 illustrates an external configuration example in a case where the cable deceleration mechanism of the present disclosure is applied to the first shaft 201 that causes the entire arm device 200 to perform the pan operation in addition to the pair of coaxial output capstan 202 and 203 in the arm device 200 described in the above item B. Although details are omitted in FIG. 6 in order to prevent complication of the drawing, a third cable deceleration mechanism 600 including a third output capstan 602 (depicted by a dotted line in FIG. 6) rotating about the first shaft 200, a third input capstan 601 attached to an output shaft of a third motor 603, a third idler pulley 605 disposed between the third input capstan 601 and the third output capstan 602, and a third cable 604 wound around each of the third input capstan 601 and the third output capstan 602 via the third idler pulley 605 is further equipped in addition to the two cable deceleration mechanisms illustrated in FIG. 5.

By applying the cable deceleration mechanism of the present disclosure to any active shaft including the first shaft 201, it is possible to improve the degree of freedom of arrangement of each motor while maintaining the deceleration ratio and the movable range of the cable deceleration mechanism by the interposition of the idler pulley (not illustrated in FIG. 6), and to arrange each motor so that the size of the entire arm device can be reduced. Of course, by using the cable deceleration mechanism, backlashlessness and high backdrivability can be achieved.

Note that the third output capstan 602 is configured in a hollow cylindrical shape, and each cable deceleration mechanism for driving the pair of output capstans 202 and 203 is accommodated in the cylinder. Therefore, it is also possible to reduce the size of the arm device in a height direction.

D. Modification of Arrangement Pattern of Idler Pulley

In the above item C, an example in which one idler pulley is disposed between a set of input capstan and output capstan has been described with reference to FIGS. 4 and 5. The number of idler pulleys disposed between the input capstan and the output capstan is not limited to one, and may be plural. In this section D, a modification of an arrangement pattern of the idler pulley will be described.

Figure 7:
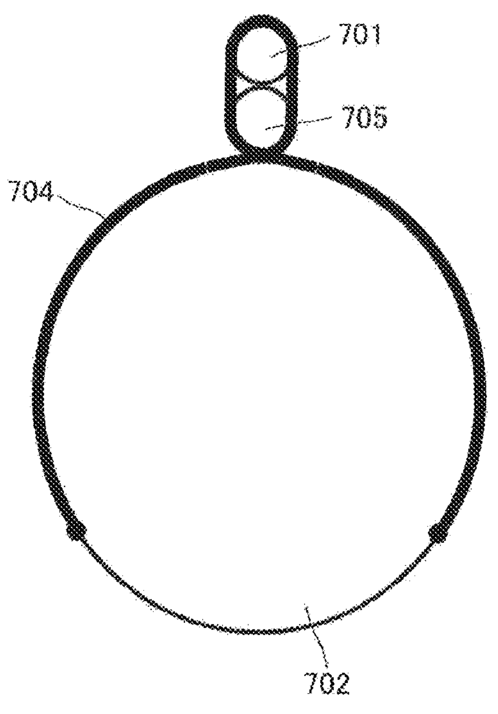
FIG. 7 is a diagram illustrating an arrangement pattern in which one idler pulley is disposed between an input capstan and an output capstan.

FIG. 7 illustrates an arrangement pattern in which one idler pulley is disposed between an input capstan and an output capstan.

In FIG. 7, an output capstan 702 is rotatable about an active shaft, such as a joint shaft included in an arm device (not illustrated). On the other hand, an input capstan 701 is attached to an output shaft of a motor (not illustrated) for driving the active shaft. In addition, an idler pulley 705 is disposed between the output capstan 702 and the input capstan 701 so as to circumscribe each of the output capstan 702 and the input capstan 701. Then, a cable 704 bundles and winds around the input capstan 701 and the idler pulley 705, and then, is wound around the output capstan 702. Both ends of the cable 704 are fixed to the outer periphery of the output capstan 702. A method of coupling a terminal end of the cable 704 and the output capstan 702 is arbitrary. In addition, it is preferable to insert, for example, a spring or the like into the vicinity of at least one terminal end of the cable 704 to apply pre-tension, but a pre-tension applying mechanism is not illustrated in FIG. 7. The idler pulley 705 is adjacent to the output capstan 702.

The idler pulley 705 is disposed between the input capstan 701 and output capstan 702 spaced apart from each other and has the function of adjusting the layout of the cable 704 so as to reduce a region where the cable 704 floats from the outer periphery of the output capstan 702. Note that, in the example illustrated in FIG. 7, since the cable 704 intersects between the idler pulley 705 and the output capstan 702, a winding direction of the cable 704 is opposite between the input capstan 701 and the output capstan 702.

The input capstan 701 is rotationally driven by a motor (not illustrated), then, the cable 704 wound around the input capstan 701 is pulled in the rotation direction of the input capstan 701, and a traction force is transmitted to the output capstan 702 via the idler pulley 705. Since the cable 704 is wound around the input capstan 701 and the output capstan 702 in opposite directions, the rotation directions of the input capstan 701 and the output capstan 702 are opposite. That is, when the input capstan 701 rotates forward, the output capstan 702 rotates backward, and when the input capstan 701 rotates backward, the output capstan 702 rotates forward.

The radius r2 of the input capstan 701 is smaller than the radius r1 of the output capstan 702, and the ratio of the radii of the input capstan and the output capstan corresponds to the deceleration ratio in the cable deceleration mechanism illustrated in FIG. 7. The diameter ($2\times r1$) of the input capstan 701 can be made smaller than the outer shape of the motor because the motor (not illustrated) can be disposed at a position where the motor does not interfere with other mechanical elements without changing the size of the input capstan 701 by the interposition of the idler pulley 705, and a high deceleration ratio can be set. In addition, by adjusting the layout of the cable 704 by the idler pulley 705, it is possible to maintain the movable range of the cable deceleration mechanism by preventing a region where the cable 704 floats from the outer periphery of the output capstan 702 from being increased.

Figure 8:
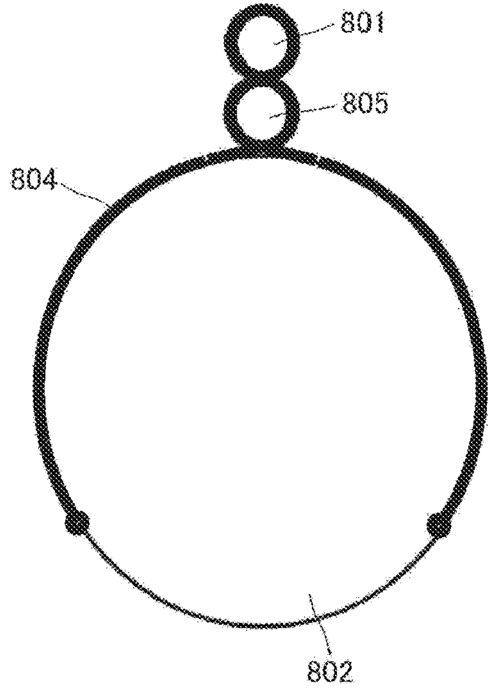
FIG. 8 is a diagram illustrating another arrangement pattern in which one idler pulley is arranged between an input capstan and an output capstan.

FIG. 8 illustrates another arrangement pattern in which one idler pulley is disposed between an input capstan and an output capstan. The point that one idler pulley 805 is disposed between an output capstan 802 and an input capstan 801 is similar to the cable deceleration mechanism illustrated in FIG. 7. The idler pulley 805 has a function of adjusting the layout of the cable 804 similarly to the example illustrated in FIG. 7, and even when there is a gap between the input capstan 801 and the output capstan 802, a region where the cable 804 floats from the outer periphery of the output capstan 802 is reduced.

In FIG. 8, a method of winding the cable 804 is different from the method in FIG. 7. As can be seen in FIG. 8, the cable 804 is wound around the input capstan 801, but one end of the cable 804 is wound around the idler pulley 805 in a direction opposite to the input capstan 801 by about a half turn, and then wound around the output capstan 802 in a direction opposite to the idler pulley 805, and a terminal end is fixed. In addition, another end of the cable 804 is also wound around the idler pulley 805 about a half turn in a direction opposite to the one end, and then wound around the output capstan 802 in a direction opposite to the idler pulley 805, and the terminal end is fixed. Therefore, in the example illustrated in FIG. 8, a winding direction of the cable 804 is the same between the input capstan 801 and the output capstan 802. Therefore, when the input capstan 801 rotates forward, the output capstan 802 also rotates forward, and when the input capstan 801 rotates backward, the output capstan 802 also rotates backward.

The ratio between the radius r2 of the input capstan 801 and the radius r1 of the output capstan 802 corresponds to the deceleration ratio in the cable deceleration mechanism similarly to the cable deceleration mechanism illustrated in FIG. 7. The diameter (2×r1) of the input capstan 801 can be made smaller than the outer shape of the motor because the motor (not illustrated) can be disposed at a position where the motor does not interfere with other mechanical elements by the interposition of the idler pulley 805, and a high deceleration ratio can be set. In addition, by adjusting the layout of the cable 804 by the idler pulley 805, it is possible to maintain the movable range of the cable deceleration mechanism by preventing a region where the cable 804 floats from the outer periphery of the output capstan 802 from being increased.

Figure 9:
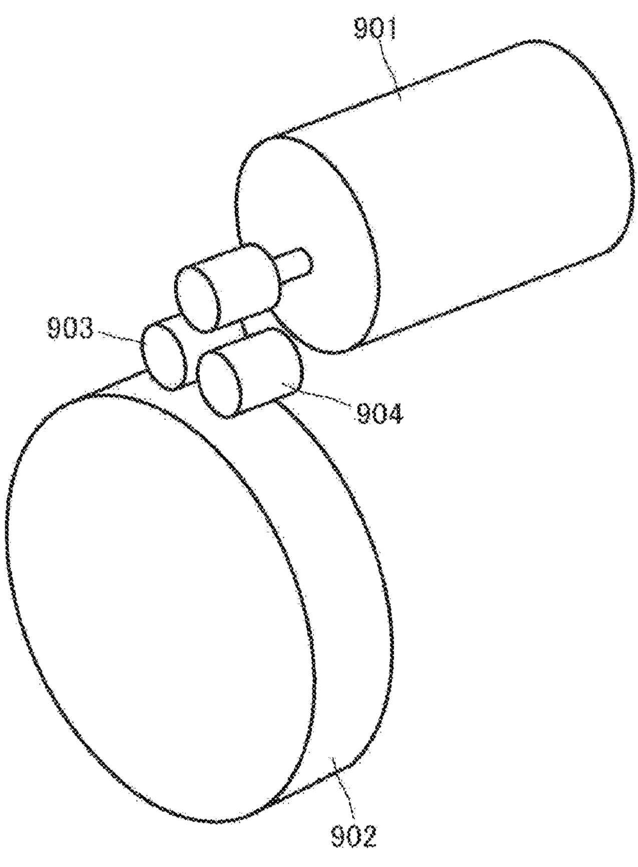
FIG. 9 is a diagram illustrating an arrangement pattern in which two idler pulleys are arranged between an input capstan and an output capstan.

FIG. 9 illustrates a perspective view of an arrangement pattern in which two idler pulleys 903 and 904 are disposed between an input capstan 901 and an output capstan 902. However, for simplification of the drawing, illustration of the cable is omitted in FIG. 9. If the distance between the two idler pulleys 903 and 904 is increased and the input capstan 901 is disposed between the idler pulleys 903 and 904, the input capstan 901 and the output capstan 902 can be brought close to each other to a distance shorter than the outer diameters of the idler pulleys 903 and 904, which contributes to a reduction in size of the entire device. Then, by using the two idler pulleys 903 and 904, the cable (not illustrated) can be wound so that a region floating from the outer periphery of the output capstan 904 is minimized, and the movable range of the cable deceleration mechanism can be secured.

On the other hand, in the configuration in which the cable is wound from the input capstan to the output capstan via only one idler pulley as illustrated in FIGS. 7 and 8, the distance between the input capstan and the output capstan is equal to or longer than the outer diameter of the idler pulley. For example, as the distance between the outer periphery of the input capstan and the outer periphery of the output capstan decreases, the radius of curvature of the cable wound around the idler pulley decreases by an amount corresponding to a decrease in diameter of the idler pulley, the stress applied to the cable increases, and there is a possibility that the cable is plastically deformed.

Figure 10:
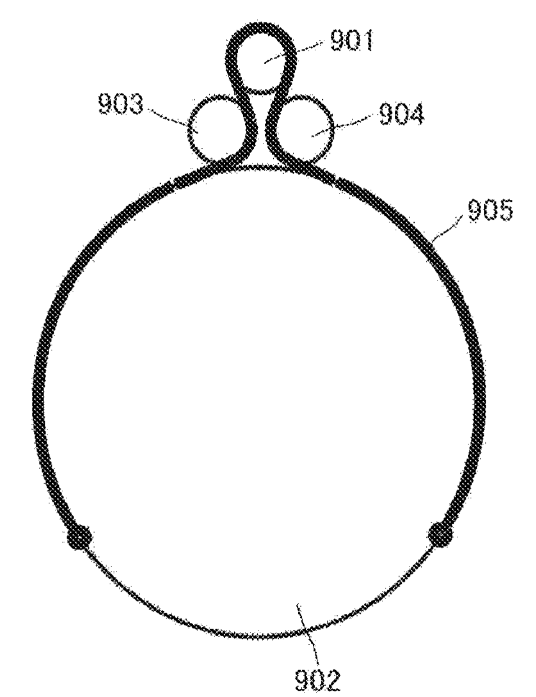
FIG. 10 is a diagram illustrating a pattern of a cable layout in a cable deceleration mechanism using two idler pulleys.
Figure 11:
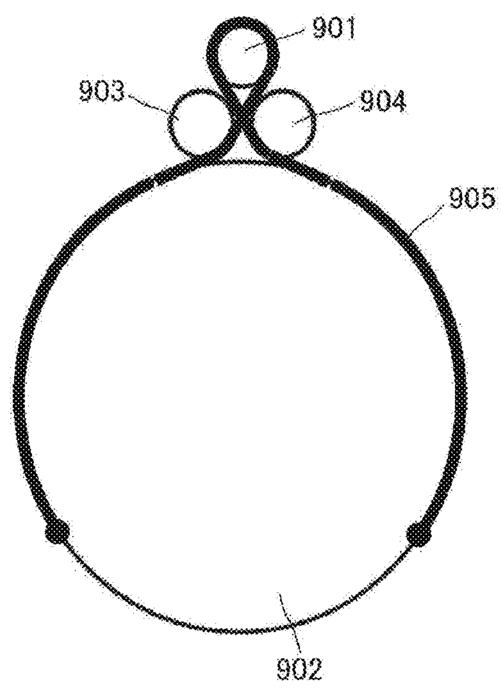
FIG. 11 is a diagram illustrating a pattern of a cable layout in the cable deceleration mechanism using two idler pulleys.
Figure 12:
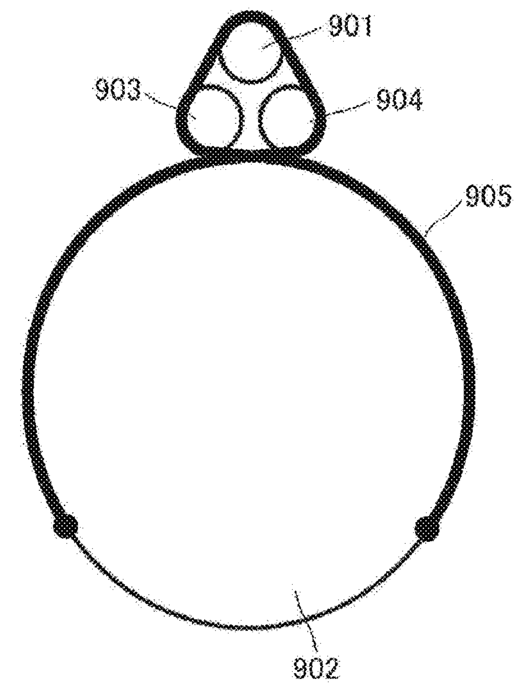
FIG. 12 is a diagram illustrating a pattern of a cable layout in the cable deceleration mechanism using two idler pulleys.

FIGS. 10 to 12 illustrate patterns of the cable layout in a case where two idler pulleys are disposed between the input capstan and the output capstan. In either case, the input capstan 901 is disposed such that the distance between the two idler pulleys 903 and 904 is increased to approach the output capstan 902 from between the idler pulleys 903 and 904. In the example illustrated in FIGS. 10 to 12, even if the idler pulley decreases in diameter as the distance between the outer peripheries of the input capstan and the output capstan decreases, the radius of curvature of the cable when winding around the idler pulley does not need to be reduced, and plastic deformation of the cable can be prevented.

In the example illustrated in FIG. 10, a cable 905 wound around the input capstan 901 is passed between the two idler pulleys 903 and 904 and then wound around the output capstan 902. Both ends of the cable 905 are fixed to the outer periphery of the output capstan 902. A method of coupling a terminal end of the cable 905 and the output capstan 902 is arbitrary. It is preferable to insert, for example, a spring or the like into at least one terminal end of the cable 905 to apply pre-tension, but a pre-tension applying mechanism is not illustrated in FIG. 10. In addition, in the example illustrated in FIG. 10, the cable 905 is wound around the input capstan 901 and the output capstan 902 in the same direction. Therefore, when the input capstan 901 rotates forward, the output capstan 902 also rotates forward, and when the input capstan 901 rotates backward, the output capstan 902 also rotates backward.

In the example illustrated in FIG. 11, the cable 905 wound around the input capstan 901 is passed between the idler pulley 903 and the idler pulley 904 similarly to the cable layout illustrated in FIG. 10, but is different in that the cable 905 is crossed between the idler pulley 903 and the idler pulley 904. Therefore, in the example illustrated in FIG. 11, since the cable 905 is wound around the input capstan 901 and the output capstan 902 in opposite directions, the output capstan 902 rotates in a reverse direction when the input capstan 901 rotates in a forward direction, and the output capstan 902 rotates in the forward direction when the input capstan 901 rotates in the reverse direction.

In the example illustrated in FIG. 12, the cable 905 bundles and winds around the input capstan 901, the idler pulley 903, and the idler pulley 904, and then, is wound around the output capstan 902. In the example illustrated in FIG. 12, since the cable 905 intersects between the idler pulleys 903 and 904 and the output capstan 902, a winding direction of the cable 905 is opposite between the input capstan 901 and the output capstan 902. Therefore, when the input capstan 901 rotates forward, the output capstan 902 rotates backward, and when the input capstan 901 rotates backward, the output capstan 902 rotates forward. Compared to the cable layout illustrated in FIGS. 10 and 11, in the example illustrated in FIG. 12, a region where the cable 905 floats from the outer periphery of the output capstan 902 can be minimized.

In the cable deceleration mechanism to which the present disclosure is applied, the number of idler pulleys disposed between the input capstan and the output capstan is not limited. Although not described in the present specification, three or more idler pulleys can be disposed between the input capstan and the output capstan to configure the cable deceleration mechanism.

Regardless of the number of the idler pulleys, even when the input capstan and the output capstan are disposed apart from each other, by adjusting the layout of the cable by interposing the idler pulleys, it is possible to reduce the region where the cable floats from the outer periphery of the output capstan and maximize the movable range that can be used as a decelerator.

E. Specific Configuration Example of Arm Device

In this item E, a specific configuration example will be described in a case where the cable deceleration mechanism including the arrangement pattern of the idler pulleys described in the above item D with reference to FIG. 7 is applied to each active shaft of the arm device 200 having the configuration of the degree of freedom described in the above item B.

Figure 13:
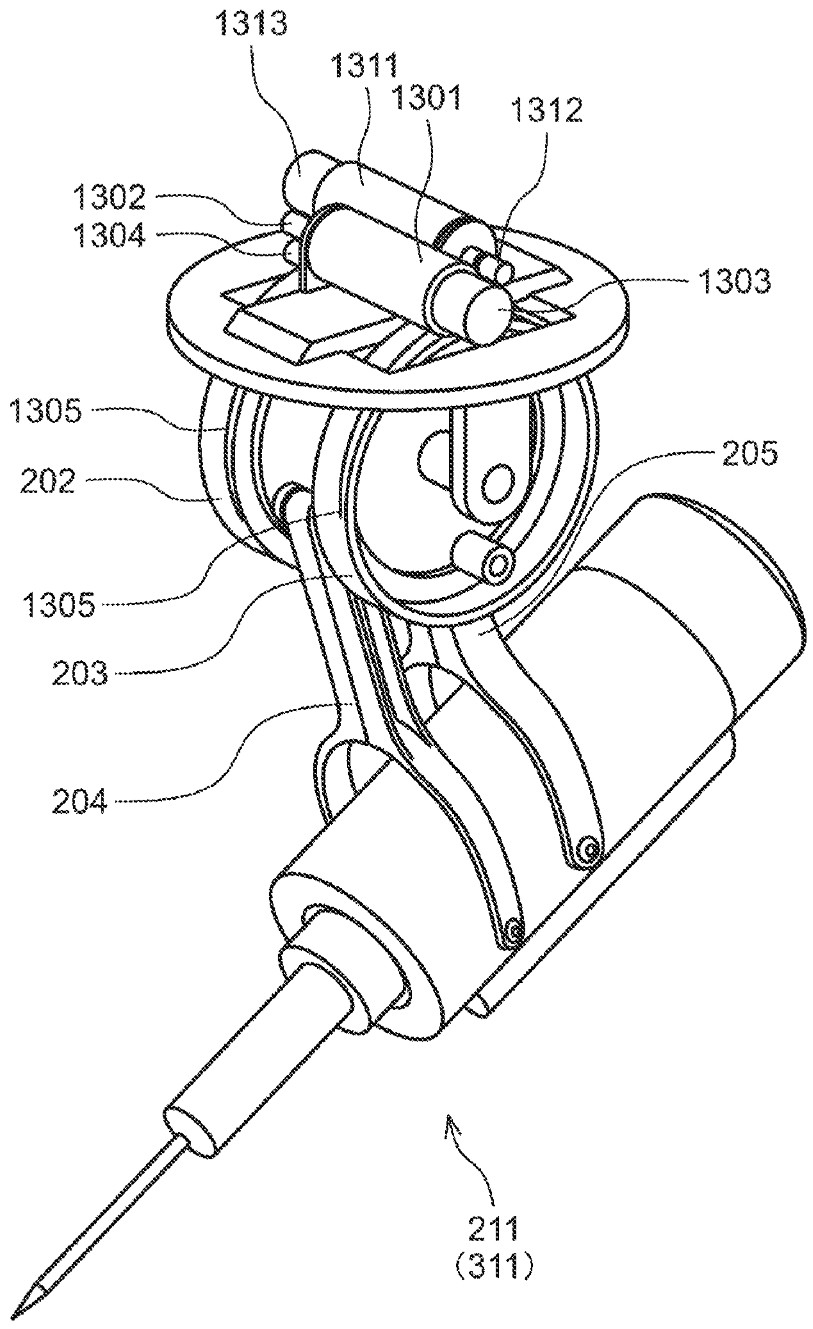
FIG. 13 is a diagram (perspective view) illustrating a specific configuration example in which a cable deceleration mechanism is applied for driving a pair of coaxial output capstans.
Figure 14:
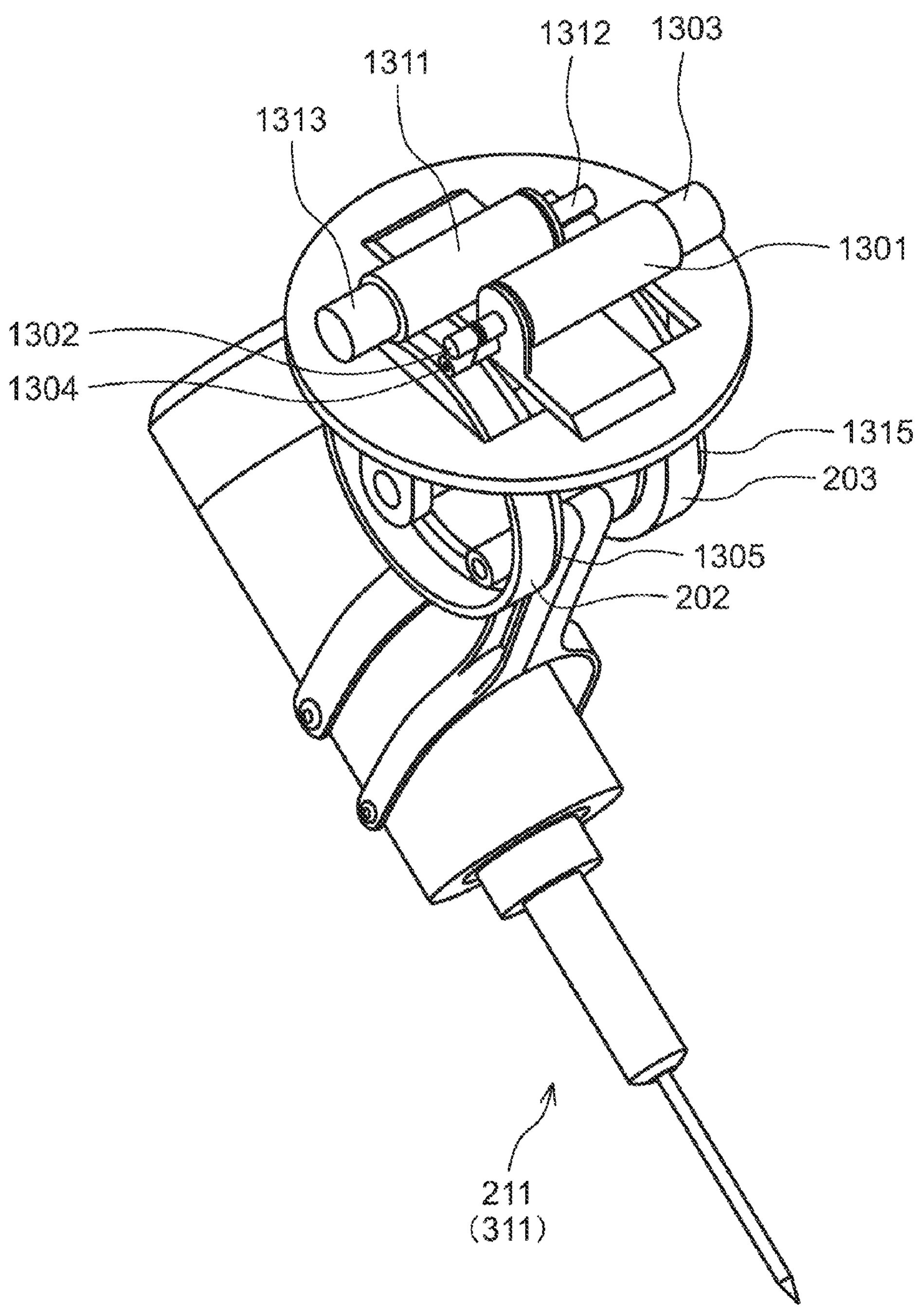
FIG. 14 is a diagram (perspective view) illustrating a specific configuration example in which the cable deceleration mechanism is applied for driving a pair of coaxial output capstans.
Figure 15:
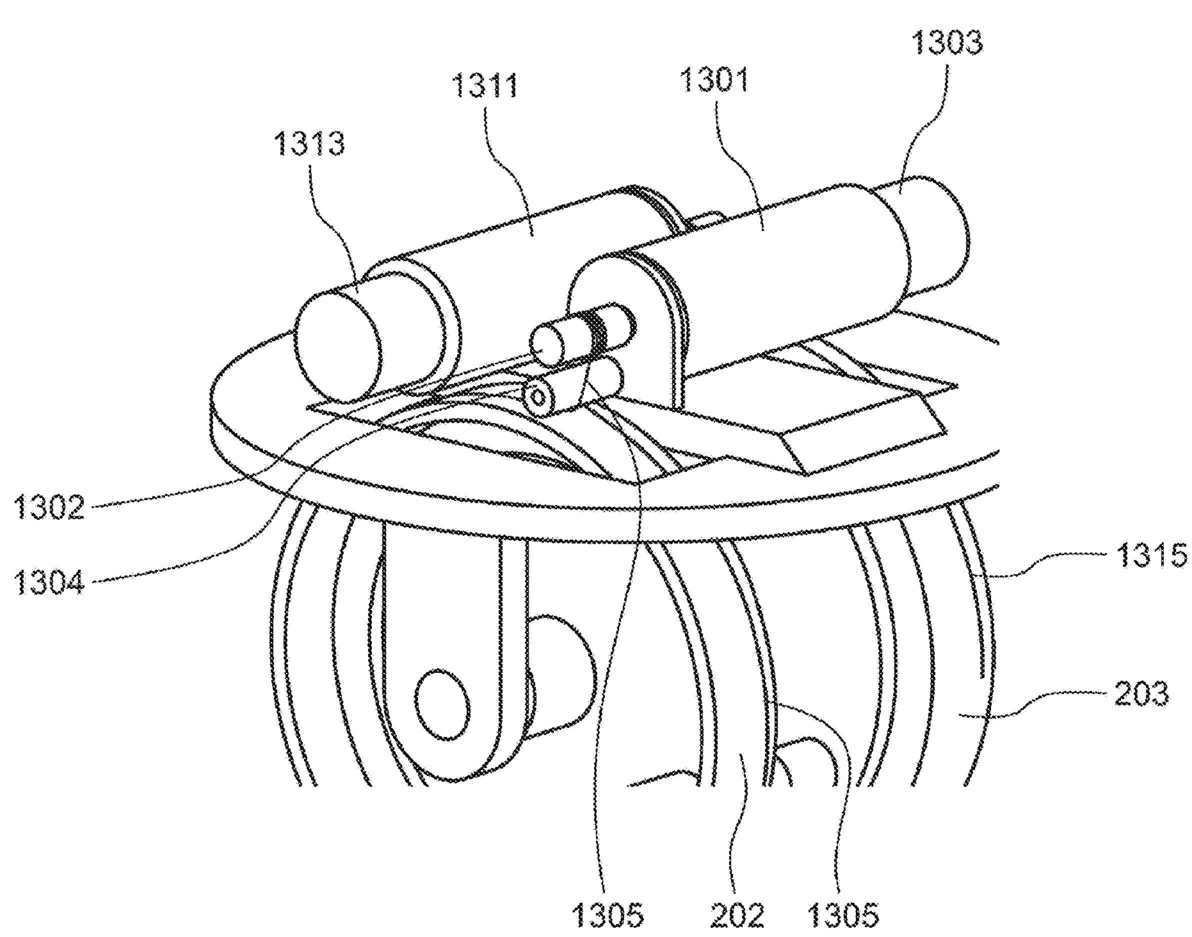
FIG. 15 is a diagram (enlarged view of a vicinity of a cable decelerator) illustrating a specific configuration example in which the cable deceleration mechanism is applied for driving a pair of coaxial output capstans.

FIGS. 13 to 15 illustrate a specific configuration example in which the cable deceleration mechanism is applied for driving the pair of coaxial output capstans 202 and 203. However, FIGS. 13 and 14 illustrate the cable deceleration mechanism of each of the output capstans 202 and 203 in a perspective manner while changing a line-of-sight direction. In addition, FIG. 15 illustrates a vicinity of the cable deceleration mechanism of each of the output capstans 202 and 203 in an enlarged manner.

Figure 16:
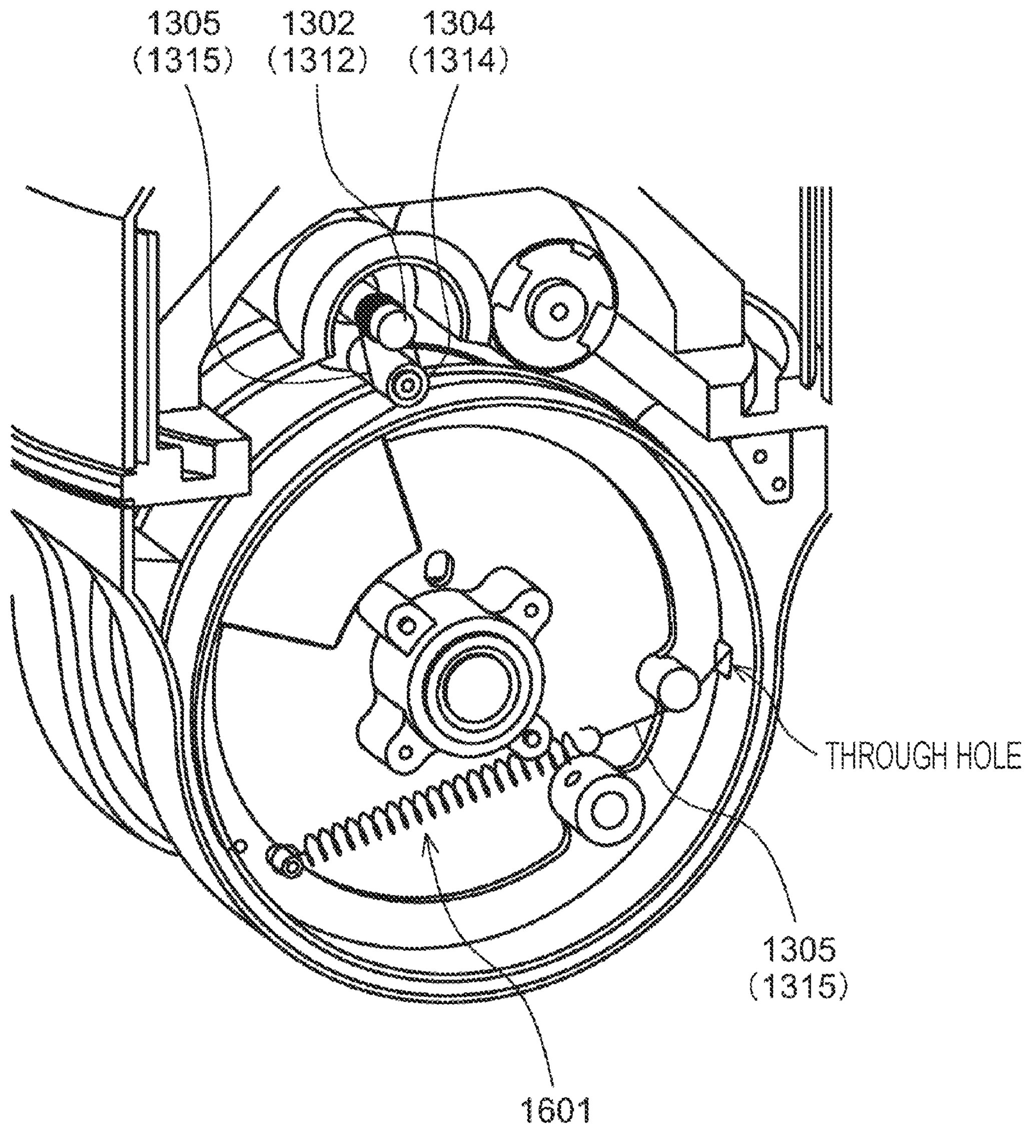
FIG. 16 is a diagram illustrating an arrangement example of a tension coil spring that applies a pre-tension to a cable.

An input capstan 1302 is attached to an output shaft of a motor 1301 for rotationally driving the one output capstan 202, and an encoder 1303 for measuring a rotation angle of the motor 1301 is attached to the opposite side. In addition, an idler pulley 1304 is disposed so as to circumscribe each of the output capstan 202 and the input capstan 1302. Then, a cable 1305 bundles and winds around the input capstan 1302 and the idler pulley 1304, and then, is wound around the output capstan 202 in an opposite direction. Both ends of the cable 1305 are fixed to the outer periphery of the output capstan 202. A method of coupling a terminal end of the cable 1305 and the output capstan 202 is arbitrary. In addition, it is preferable to insert, for example, a spring or the like into the vicinity of at least one terminal end of the cable 1304 to apply pre-tension. The output capstan 202 has a cylindrical shape. As illustrated in FIG. 16, the cable 1305 is wound around the outer periphery of the output capstan 202 by a rotation angle corresponding to the movable range of the output capstan 202, and then drawn into the cylinder through a through hole drilled in the outer periphery of the output capstan 202. Then, one terminal end of the cable 1305 is fixed to the output capstan 202 via a tension coil spring 1601 that applies a pre-tension. The cable 1305 is wound around the input capstan 1302 and the output capstan 202 in the opposite directions, so that the output capstan 202 rotates in an opposite direction to the rotation direction of the motor 1301.

A similar configuration applies to the another output capstan 203. An input capstan 1312 is attached to an output shaft of a motor 1311 for rotationally driving the output capstan 203, and an encoder 1313 for measuring a rotation angle of the output shaft is attached to the opposite side. In addition, an idler pulley 1314 is disposed so as to circumscribe each of the output capstan 203 and the input capstan 1312. Then, a cable 1315 bundles and winds around the input capstan 1312 and the idler pulley 1314, and then, is wound around the output capstan 203 in an opposite direction. Both ends of the cable 1305 are fixed to the outer periphery of the output capstan 202. The cable 1315 is wound around the input capstan 1312 and the output capstan 203 in the opposite directions, so that the output capstan 203 rotates in an opposite direction to the rotation direction of the motor 1311. It is preferable to insert, for example, a spring or the like into the vicinity of at least one terminal end of the cable 1315 to apply pre-tension. The output capstan 203 also has a cylindrical shape similarly to the output capstan 202. As illustrated in FIG. 16, the cable 1315 is wound around the outer periphery of the output capstan 203 by a rotation angle corresponding to the movable range of the output capstan 203, and then drawn into the cylinder through a through hole drilled in the outer periphery of the output capstan 203. Then, one terminal end of the cable 1315 is fixed to the output capstan 203 via a tension coil spring 1601 that applies a pre-tension. The cable 1315 is wound around the input capstan 1312 and the output capstan 203 in the opposite directions, so that the output capstan 203 rotates in an opposite direction to the rotation direction of the motor 1311.

The output capstan 202 and the output capstan 203 have a common rotation axis 209. As illustrated in FIGS. 2 and 3, the output capstan 202 rotatably supports the upper end portion of the tilt link 204 about the axis parallel to the rotation axis 209 at a position separated from the rotation axis 209 by a predetermined length in the radial direction. Similarly, the output capstan 203 rotatably supports an upper end portion of the tilt link 205 about an axis parallel to the rotation axis 209 at a position separated from the rotation axis 209 by the same distance in the radial direction. The tilt link 204 and the tilt link 205 are arranged to be line-symmetric with respect to a straight line passing through the rotation axis 209, and this line-symmetric relationship is maintained during driving of the arm device 200.

The line connecting the upper ends of the tilt link 204 and the tilt link 205 serves as a driving link of the parallel link mechanism (see FIG. 2 and the above description). The two tilt links 204 and 205 constitute an intermediate link of the parallel link mechanism. In addition, the surgical tool unit 211 supported by lower ends of the two tilt links 204 and 205 constitutes a driven link of the parallel link mechanism.

The output capstan 202 and the output capstan 203 are rotated in the same rotation direction by the same rotation angle, and then, the parallel link mechanism rotates together about the rotation axis 209 in the same orientation, and the driven link 206 and the surgical tool unit 211 (alternatively, the operation input unit 311) attached to the driven link 206 can be tilted about the rotation axis 209 (which is referred to as "first tilting operation"). The tilt link 204 and the tilt link 205 are arranged to be line-symmetric with respect to a straight line passing through the rotation axis 209, but the orientations of the tilt link 204 and the tilt link 205 with respect to the rotation axis 209 do not change during the first tilting operation.

Furthermore, the output capstan 202 and the output capstan 203 are rotated so that the rotation angle about the rotation axis 209 changes, the orientation of the parallel link mechanism changes, and the surgical tool unit 211 (alternatively, the operation input unit 311) can be tilted while being at such a position as to be suspended by the tilt links 204 and 205 (which is referred to as a second tilting operation). During the second tilting operation, the orientations of the tilt link 204 and the tilt link 205 with respect to the rotation axis 209 change, but the relationship in which the tilt link 204 and the tilt link 205 are line-symmetric with respect to the straight line passing through the rotation axis 209 is maintained.

Figure 17:
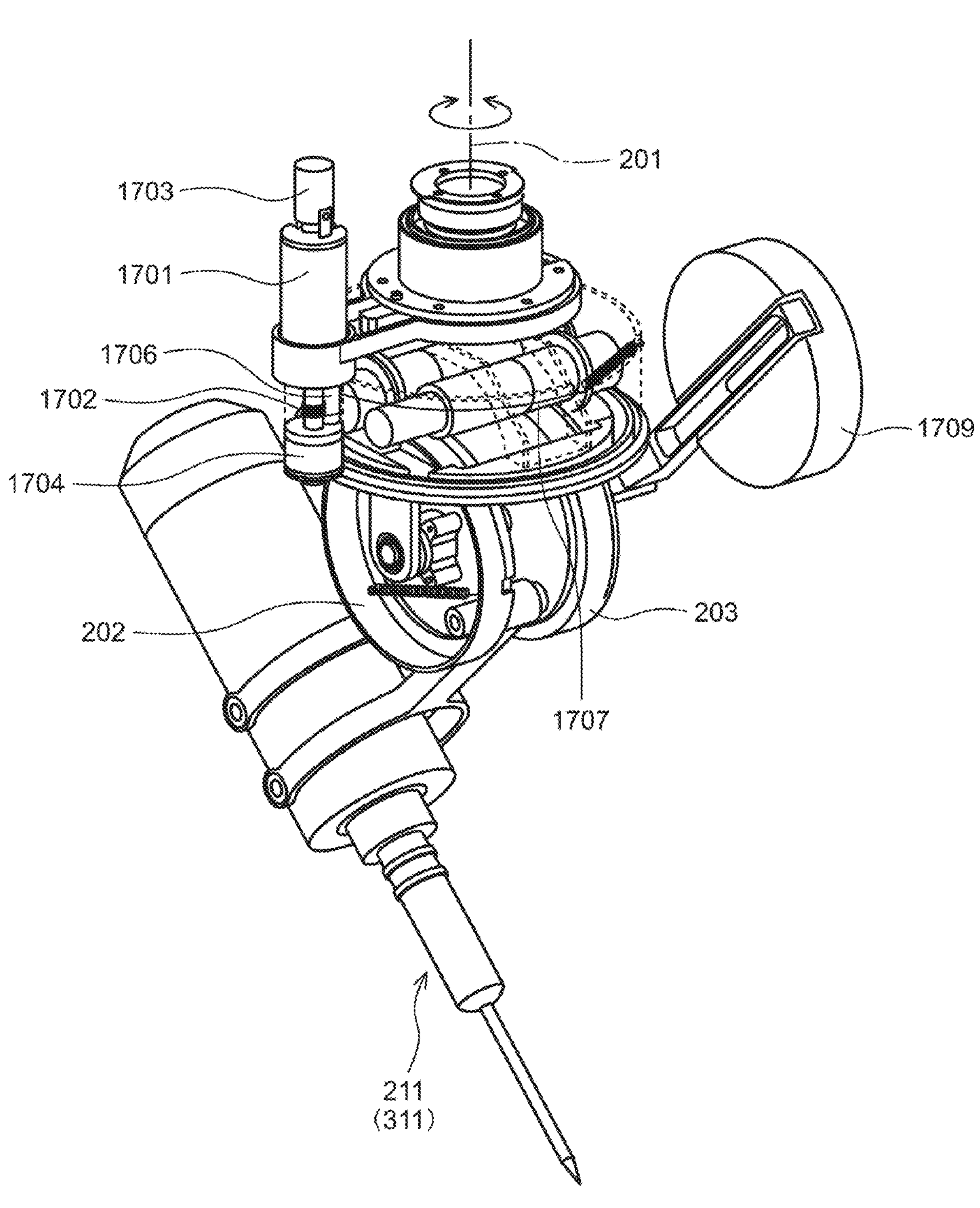
FIG. 17 is a diagram (perspective view of the arm device 200) illustrating a specific configuration example in which the cable deceleration mechanism is applied for driving a first shaft 201.
Figure 18:
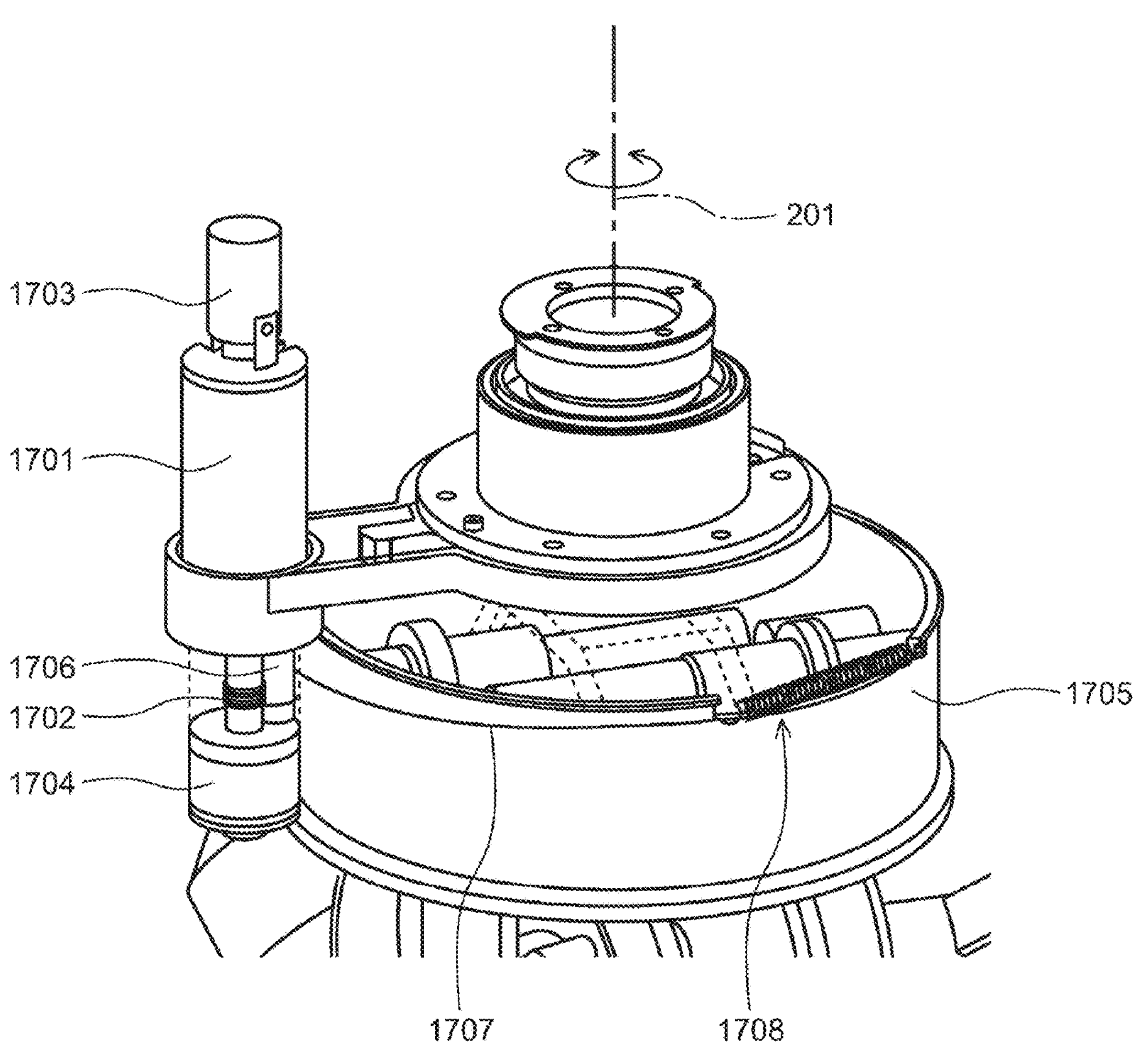
FIG. 18 is a diagram (enlarged view of a vicinity of the cable deceleration mechanism) illustrating a specific configuration example in which the cable deceleration mechanism is applied for driving the first shaft 201.

FIGS. 17 and 18 illustrate a specific configuration example in which the cable deceleration mechanism is further applied for driving the first shaft 201 in addition to the output capstans 202 and 203. However, FIG. 17 illustrates the entire arm device 200 in a perspective manner. In addition, FIG. 18 illustrates a vicinity of the cable deceleration mechanism of the first shaft 201 in an enlarged manner.

An input capstan 1702 is attached to an output shaft of a motor 1701, and an encoder 1703 for measuring a rotation angle of the motor 1701 is attached to the opposite side. Furthermore, a brake 1704 that brakes the rotation of the motor 1701 is further attached to a tip of the input capstan 1702. The output capstan 1705 has the first shaft 201 as a rotation axis. The output capstan 1705 is a cylindrical structure, and a cable is wound around the outer periphery of the cylinder to be used as an output capstan, while other parts (for example, a cable deceleration mechanism for driving the other output capstan 202 and 203) can be accommodated inside the cylinder. In FIG. 17, the output capstan 1705 is made transparent and only the outline is drawn with a dotted line to clarify the internal structure.

An idler pulley 1706 is disposed so as to circumscribe each of the output capstan 1705 and the input capstan 1702. Then, a cable 1707 bundles and winds around the input capstan 1702 and the idler pulley 1706, and then, is wound around the output capstan 1705 in an opposite direction. Both ends of the cable 1707 are fixed to the outer periphery of the output capstan 1705. A method of coupling a terminal end of the cable 1707 and the output capstan 1705 is arbitrary. In addition, it is preferable to insert, for example, a coil spring or the like into the vicinity of at least one terminal end of the cable 1707 to apply pre-tension. In the example illustrated in FIGS. 17 and 18, the output capstan 1705 has a cylindrical shape, the cable 1707 is wound around the outer periphery of the output capstan 1705 by a rotation angle corresponding to the movable range of the output capstan 1705, and then drawn into the cylinder through a through hole drilled in the outer periphery of the output capstan 1705. Then, one terminal end of the cable 1707 is fixed to an inner wall of the cylinder of the output capstan 1705 via a tension coil spring 1708 that applies a pre-tension. The cable 1707 is wound around the input capstan 1702 and the output capstan 1705 in the opposite directions, so that the output capstan 1705 rotates in an opposite direction to the rotation direction of the motor 1701.

Note that, referring to FIG. 17, a counterbalance 1709 for balancing a weight of the entire arm device 200 regardless of a tilt position of the surgical tool unit 211 is attached to the common rotation axis 209 of the output capstan 202 and the output capstan 203. When the surgical tool unit 211 performs the tilting operation about the rotation axis 209, then, the counterbalance 1709 also rotates symmetrically about the rotation axis 209, and the entire weight balance of the arm device 200 is maintained.

Furthermore, the output capstan 1705 for the first shaft 201 is configured in a hollow cylindrical shape, and each cable deceleration mechanism for driving the pair of output capstans 202 and 203 is accommodated in the cylinder. Therefore, it is also possible to reduce the size of the arm device 200 in the height direction.

Figures 19A, 19B, 19C:
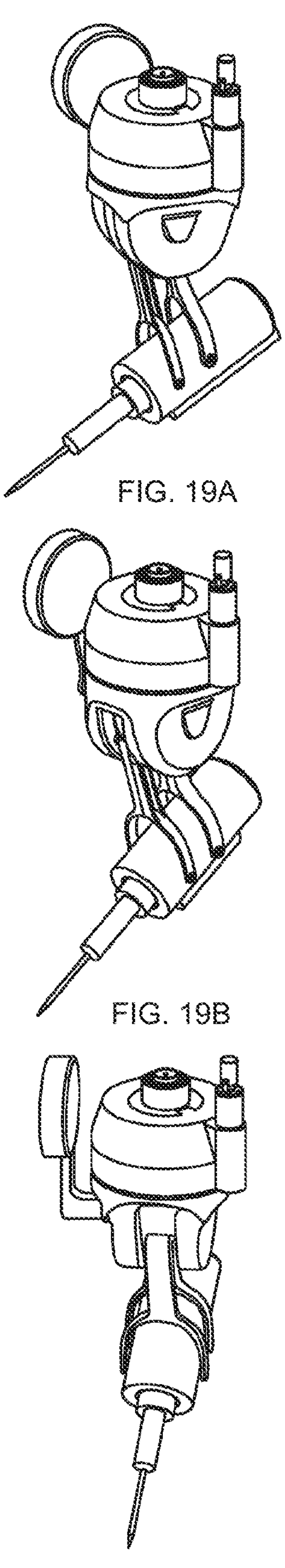
FIGS. 19A, 19B, and 19C are diagrams illustrating a series of operations in which the arm device 200 pans a surgical tool unit 211.

FIGS. 19A, 19B, to and 19C illustrate a series of operations in which the arm device 200 pans the surgical tool unit 211. The arm device 200 can cause the surgical tool unit 211 to perform the pan operation about the first shaft 201 by driving the first shaft 201.

Figure 20A:
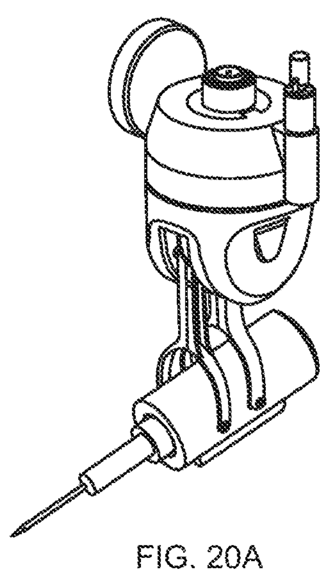
FIGS. 20A, 20B, and 20C are diagrams illustrating a series of operations in which the arm device 200 tilts the surgical tool unit 211 with respect to the body of the arm device 200.
Figure 20B:
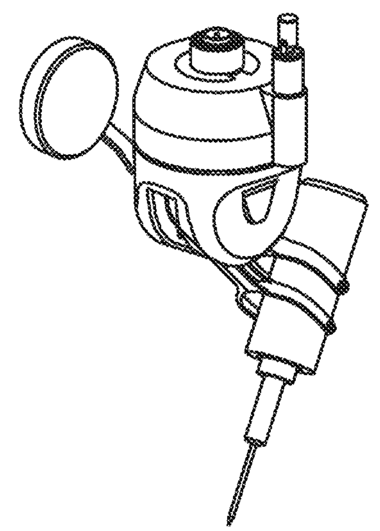
Figure 20C:
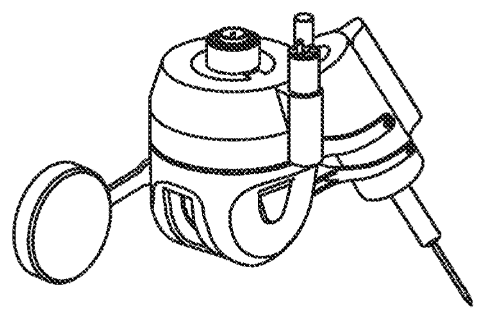

Furthermore, FIGS. 20A, 20B, and 20C illustrate a series of operations in which the arm device 200 tilts the surgical tool unit 211 with respect to the body of the arm device 200. The output capstan 202 and the output capstan 203 are rotated in the same rotation direction by the same rotation angle, and then, the parallel link mechanism rotates together about the rotation axis 209 in the same orientation, and the driven link 206 and the surgical tool unit 211 attached to the driven link 206 can be tilted about the rotation axis 209 (which is referred to as "first tilting operation").

Figure 21A:
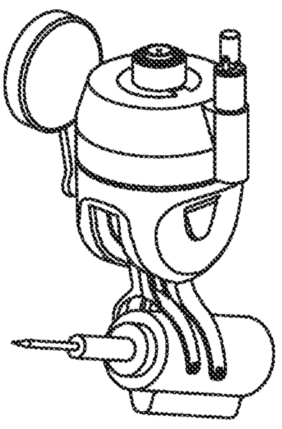
FIGS. 21A, 21B, and 21C diagrams illustrating a series of operations in which the arm device 200 tilts the surgical tool unit 211 at a current position.
Figure 21B:
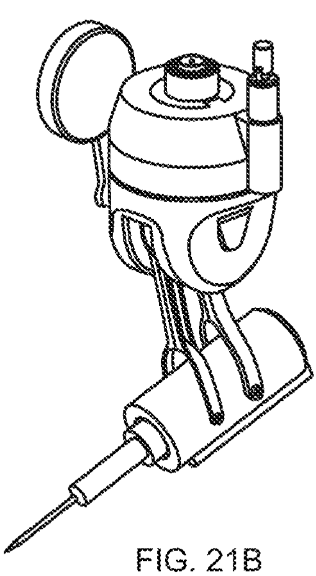
Figure 21C:
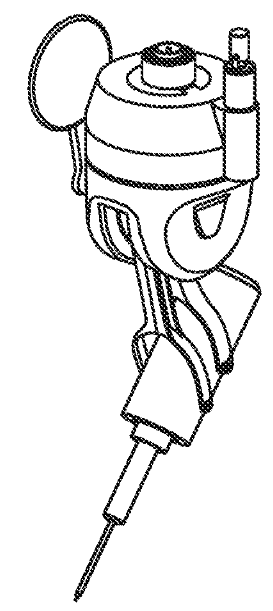

Furthermore, FIGS. 21A, 21B, and 21C illustrate a series of operations in which the arm device 200 tilts the surgical tool unit 211 at the current position. The output capstan 202 and the output capstan 203 are rotated so that the rotation angle about the rotation axis 209 changes, the orientation of the parallel link mechanism changes, and the surgical tool unit 211 can be tilted while being at such a position as to be suspended by the tilt links 204 and 205 (which is referred to as a second tilting operation).

INDUSTRIAL APPLICABILITY

The present disclosure has been described in detail with reference to the specific embodiments. However, it is obvious that those skilled in the art can make modifications and substitutions of the embodiment without departing from the scope of the present disclosure.

The arm device of the present disclosure is applied to, for example, a surgical robot used in the medical field, and is used by mounting an end effector including a surgical tool or an observation device (such as an endoscope) at the distal end. Since the arm device of the present disclosure includes the cable deceleration mechanism in at least some of the active joints, the arm device has backlashlessness and high backdrivability, and thus can achieve precise force control.

In addition, the arm device of the present disclosure can be applied to a wide variety of fields such as a remote operation robot that performs precise work in a difficult-to-work space such as a manufacturing factory, a construction site, or outer space, and an operation console device for remote operation.

In short, the present disclosure has been described in an illustrative manner, and the contents described in the present specification should not be interpreted in a limited manner. In order to determine the gist of the present disclosure, the claims should be taken into consideration.

Note that the present disclosure may also have the following configurations.

(1) An arm device including one or more active shafts includes an input capstan attached to an output shaft of a motor for driving at least one active shaft of the one or more active shafts, an output capstan attached to the at least one active shaft, an idler pulley disposed between the input capstan and the output capstan, and a cable wound around an outer periphery of each of the input capstan and the output capstan via the idler pulley.

(2) The arm device of (1) described above further includes a first output capstan and a second output capstan rotatable about a common active shaft, a first cable deceleration mechanism that transmits rotation of a first motor to the first output capstan by using a first input capstan and a first idler pulley attached to an output shaft of the first motor, and a second cable deceleration mechanism that transmits rotation of a second motor to the second output capstan by using a second input capstan and a second idler pulley attached to an output shaft of the second motor.

(3) In the arm device according to (2) described above, the first motor is disposed in a direction of the second output capstan or to overlap with the second output capstan, and the second motor is disposed in a direction of the first output capstan or to overlap with the first output capstan.

(4) The arm device according to any one of (2) or (3) described above further includes a third output capstan for driving a pan shaft, the third output capstan causing a whole of the arm device to perform a pan operation, and a third cable deceleration mechanism that transmits rotation of a third motor to the third output capstan by using a third input capstan and a third idler pulley attached to an output shaft of the third motor.

(5) The arm device according to any one of (2) to (4) described above further includes a first link that is driven by the first output capstan, and a second link that is driven by the second output capstan.

(6) In the arm device according to (5) described above, each end of the first link and the second link supports a driving unit or an operation unit.

(7) In the arm device according to any one of (5) or (6) described above, the first link and the second link are arranged to be line-symmetric with each other.

(8) In the arm device according to any one of (1) to (7) described above, the input capstan has a radius that is smaller than a radius of the motor.

(9) In the arm device according to (8) described above, the radius of the motor includes a radius including an encoder and a brake integrated with the motor.

(10) In the arm device according to any one of (1) to (9) described above, the cable bundles and winds around the input capstan and the idler pulley, and then, is wound around the output capstan.

(11) In the arm device according to any one of (1) to (9) described above, the cable is wound around the idler pulley in a direction opposite to the input capstan after being wound around the input capstan, and further wound around the output capstan in a direction opposite to the idler pulley.

(12) In the arm device according to any one of (1) to (9) described above, two or more idler pulleys are disposed between the output capstan and the input capstan.

(13) The arm device according to (12) described above further includes two idler pulleys are provided between the input capstan and the output capstan, in which the input capstan is disposed to increase a distance between the two idler pulleys such that the input capstan approaches the output capstan from between the two idler pulleys.

(14) In the arm device according to (12) described above, the cable is wound around the input capstan, then passes between the two idler pulleys, and then wound around the output capstan.

(15) In the arm device according to (14) described above, the cable intersects when passing between the two idler pulleys.

(16) In the arm device according to (12) described above, the cable bundles and winds around the input capstan and the two idler pulleys, and then, is wound around the output capstan.

(17) The arm device according to any one of (1) to (16) described above further includes a pre-tension applying mechanism that applies a pre-tension to the cable.

(18) In the arm device according to (17) described above, the pre-tension applying mechanism includes a tension coil spring inserted near an end where the cable is coupled with the output capstan.

(19) In the arm device according to any one of (1) to (18) described above, the input capstan has a spiral groove around which the cable winds.

(20) A cable deceleration device includes an input capstan attached to an output shaft of a motor, an output capstan disposed apart from the input capstan, an idler pulley disposed between the input capstan and the output capstan, and a cable wound around an outer periphery of each of the input capstan and the output capstan via the idler pulley.

(21) A master-slave system includes a slave device including an arm device, and a master device that operates the arm device including an input capstan attached to an output shaft of a motor for driving at least one active shaft of the one or more active shafts, an output capstan attached to the at least one active shaft, an idler pulley disposed between the input capstan and the output capstan, and a cable wound around an outer periphery of each of the input capstan and the output capstan via the idler pulley.

REFERENCE SIGNS LIST

100 Master-slave system
110 Master
111 Master-side control unit
112 Operation console device
113 Presentation unit
114 Master-side communication unit
120 Slave
121 Slave-side control unit
122 Slave robot
123 Sensor unit
124 Slave-side communication unit
130 Transmission path
200 Arm device
201 First shaft (pan shaft)
202 Output capstan (first shaft side)
203 Output capstan (third shaft side)
204, 205 Tilting link
206 Driven link
207, 208 Joint shaft
209 Rotation axis (common to output capstans 202 and 203)
211 Surgical tool unit
311 Operation input unit
400 Cable deceleration mechanism
401 Input capstan
402 Output capstan
403 Motor

404 Cable
405 Idler pulley
501 Input capstan
501 Output capstan
503 Motor
504 Cable
505 Idler pulley
511 Input capstan
512 Output capstan
513 Motor
514 Cable
515 Idler pulley
600 Cable deceleration mechanism (third)
601 Input capstan
602 Output capstan
603 Motor
604 Cable
605 Idler pulley
701 Input capstan
702 Output capstan
704 Cable
705 Idler pulley
801 Input capstan
802 Output capstan
804 Cable
805 Idler pulley
901 Input capstan
902 Output capstan
903, 904 Cable
905 Idler pulley
1301 Motor
1302 Input capstan
1303 Encoder
1304 Idler pulley
1305 Cable
1311 Motor
1312 Input capstan
1313 Encoder
1314 Idler pulley
1315 Cable
1601 Tension coil spring
1701 Motor
1702 Input capstan
1703 Encoder
1704 Brake
1705 Output capstan
1706 Idler pulley
1707 Cable
1708 Tension coil spring
1709 Counterbalance

The invention claimed is:

1. An arm device, comprising:
a first input capstan attached to a first output shaft of a first motor;
a first output capstan apart from the first input capstan;
a first idler pulley between the first input capstan and the first output capstan; and
a cable wound around an outer periphery of each of the first input capstan and the first output capstan via the first idler pulley, wherein the first idler pulley is adjacent to the first output capstan.

2. The arm device according to claim 1, further comprising:
a second input capstan attached to a second output shaft of a second motor;
a second output capstan rotatable about a common active shaft with the first output capstan;
a second idler pulley;
a first cable deceleration mechanism configured to transmit rotation of the first motor to the first output capstan by use of the first input capstan and the first idler pulley; and
a second cable deceleration mechanism configured to transmit rotation of the second motor to the second output capstan by use of the second input capstan and the second idler pulley.

3. The arm device according to claim 2, wherein
an arrangement of the first motor overlaps with an arrangement of the second output capstan, and
an arrangement of the second motor overlaps with an arrangement of the first output capstan.

4. The arm device according to claim 2, further comprising:
a third output capstan;
a third input capstan attached to a third output shaft of a third motor;
a third idler pulley; and
a third cable deceleration mechanism configured to transmit rotation of the third motor to the third output capstan by use of the third input capstan and the third idler pulley, wherein
the third output capstan is configured to:
drive a pan shaft based on the transmitted rotation of the third motor; and
control, based on the drive of the pan shaft, the arm device to perform a pan operation.

5. The arm device according to claim 2, further comprising:
a first link; and
a second link, wherein
the first output capstan is configured to drive the first link, and
the second output capstan is configured to drive the second link.

6. The arm device according to claim 5, wherein an end of each of the first link and the second link is configured to support one of a driving unit or an operation unit.

7. The arm device according to claim 5, wherein an arrangement of the first link is line-symmetric with an arrangement of the second link.

8. The arm device according to claim 1, wherein a radius of the first input capstan is smaller than a radius of the first motor.

9. The arm device according to claim 8, wherein the radius of the first motor includes a radius of an encoder integrated with the first motor and a brake integrated with the first motor.

10. The arm device according to claim 1, wherein
the cable is bundled within a proximity of the first input capstan and the first idler pulley, and
the cable is wound within the proximity of the first output capstan after the cable is bundled within the proximity of the first input capstan and the first idler pulley.

11. The arm device according to claim 1, wherein
the cable is wound within a proximity of the first idler pulley in a direction opposite to the first input capstan after the cable is wound within the proximity of the first input capstan, and
the cable is further wound within the proximity of the first output capstan in a direction opposite to the first idler pulley.

12. The arm device according to claim 1, wherein
two or more idler pulleys are between the first output capstan and the first input capstan, and
the two or more idler pulleys include the first idler pulley.

13. The arm device according to claim 12, further comprising two idler pulleys between the first input capstan and the first output capstan, wherein the two or more idler pulleys include the two idler pulleys, the first input capstan is between the two idler pulleys, and the first input capstan is configured to approach the first output capstan from between the two idler pulleys.

14. The arm device according to claim 12, wherein the cable is wound around the first input capstan, the cable passes between two idler pulleys after the cable is wound around the first input capstan, the cable is wound around the first output capstan after the cable passes between the two idler pulleys, and the two or more idler pulleys include the two idler pulleys.

15. The arm device according to claim 14, wherein the cable is between the two idler pulleys and the first output capstan.

16. The arm device according to claim 12, wherein the cable is bundled within a proximity of the first input capstan and two idler pulleys, the cable is wound within the proximity of the first output capstan after the cable is bundled within the proximity of the first input capstan and the two idler pulleys, and the two or more idler pulleys include the two idler pulleys.

17. The arm device according to claim 1, further comprising a pre-tension applying mechanism configured to apply pre-tension to the cable.

18. The arm device according to claim 17, wherein the pre-tension applying mechanism includes a tension coil spring, an end of the cable is coupled with the first output capstan via the tension coil spring.

19. The arm device according to claim 1, wherein the first input capstan has a spiral groove around which the cable winds.

20. The arm device according to claim 1, wherein the first idler pulley is adjacent to the first input capstan.

21. The arm device according to claim 1, wherein a rotation axis of the first idler pulley is substantially in a same direction as a rotation axis of the first output capstan.

22. The arm device according to claim 21, wherein the rotation axis of the first idler pulley is substantially in a same direction as a rotation axis of the first input capstan.

23. The arm device according to claim 1, wherein the arm device includes a plurality of active shafts.

24. A cable deceleration device, comprising:

an input capstan attached to an output shaft of a motor;

an output capstan is apart from the input capstan;

an idler pulley between the input capstan and the output capstan; and a cable wound around an outer periphery of each of the input capstan and the output capstan via the idler pulley, wherein the idler pulley is adjacent to the output capstan.

* * * * *